United States Patent
Tuck et al.

(10) Patent No.: US 9,690,465 B2
(45) Date of Patent: Jun. 27, 2017

(54) CONTROL OF REMOTE APPLICATIONS USING COMPANION DEVICE

(71) Applicant: Microsoft Corporation, Redmond, WA (US)

(72) Inventors: Jason R. Tuck, Kirkland, WA (US); Alexander D. Tudor, Woodinville, WA (US); Marc V. Haddad, Redmond, WA (US); Matthew Alan Medak, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/723,365

(22) Filed: Dec. 21, 2012

(65) Prior Publication Data
US 2013/0321268 A1 Dec. 5, 2013

Related U.S. Application Data

(60) Provisional application No. 61/654,638, filed on Jun. 1, 2012.

(51) Int. Cl.
*G06F 3/0484* (2013.01)
*G06F 3/0488* (2013.01)
(Continued)

(52) U.S. Cl.
CPC .......... *G06F 3/04847* (2013.01); *A63F 13/06* (2013.01); *A63F 13/235* (2014.09);
(Continued)

(58) Field of Classification Search
CPC ... G06F 3/048; G06F 3/01; G06F 9/44; A63F 13/06; A63F 13/20; A63F 13/21;
(Continued)

(56) References Cited

U.S. PATENT DOCUMENTS 5,117,484 A * 5/1992 Nakagawa ............. G09G 5/391
345/600
5,467,467 A 11/1995 Ozawa
(Continued)

FOREIGN PATENT DOCUMENTS

WO 2010028690 A1 3/2010

OTHER PUBLICATIONS

Ursu et al Enhancing Social Communication and Belonging by Integrating TV Narrativity and Game-Play in Proceedings of Europeon Interacitve TV Conference, Jun. 3, 2009, 3 pages.
(Continued)

*Primary Examiner* — David Tung
(74) *Attorney, Agent, or Firm* — Shook, Hardy & Bacon L.L.P.

(57) ABSTRACT

Embodiments of the invention provide underlying communication functionality to enable companion experiences. A companion experience allows the user to interact with content playing on a primary device through a companion device. An application on the companion device interacts with an application running on a base device (e.g., a game console, PC, or TV) to provide additional interface options on the companion that are related to a title or application playing on the base device.

16 Claims, 14 Drawing Sheets

(51) Int. Cl.

| | |
|---|---|
| G06F 3/0354 | (2013.01) |
| A63F 13/493 | (2014.01) |
| G06F 3/01 | (2006.01) |
| A63F 13/235 | (2014.01) |
| A63F 13/812 | (2014.01) |
| G06K 9/00 | (2006.01) |
| A63F 13/20 | (2014.01) |
| G06F 3/048 | (2013.01) |
| H04L 29/06 | (2006.01) |
| H04N 21/4722 | (2011.01) |
| G06F 9/44 | (2006.01) |
| G06F 3/041 | (2006.01) |
| G06F 3/033 | (2013.01) |

(52) U.S. Cl.
CPC .......... *A63F 13/493* (2014.09); *A63F 13/812* (2014.09); *G06F 3/011* (2013.01); *G06F 3/017* (2013.01); *G06F 3/033* (2013.01); *G06F 3/03547* (2013.01); *G06F 3/041* (2013.01); *G06F 3/048* (2013.01); *G06F 3/0412* (2013.01); *G06F 3/0484* (2013.01); *G06F 3/04883* (2013.01); *G06F 9/4443* (2013.01); *G06K 9/00335* (2013.01); *H04L 65/403* (2013.01); *H04N 21/4722* (2013.01)

(58) Field of Classification Search
CPC .... A63F 13/211; A63F 13/212; A63F 13/213; A63F 13/214; A63F 13/2145
USPC .................................. 345/173–178; 715/863
See application file for complete search history.

(56) References Cited

U.S. PATENT DOCUMENTS

| | | |
|---|---|---|
| 6,816,897 B2 | 11/2004 | McGuire |
| 7,500,154 B2 | 3/2009 | Moon et al. |
| 7,512,677 B2 | 3/2009 | Cox et al. |
| 7,870,496 B1* | 1/2011 | Sherwani ............... 715/761 |
| 8,014,768 B2 | 9/2011 | Ackley |
| 8,200,795 B2 | 6/2012 | Patil |
| 8,521,888 B2 | 8/2013 | Larson et al. |
| 8,595,781 B2 | 11/2013 | Neumeier et al. |
| 8,856,355 B2 | 10/2014 | Queen |
| 9,002,018 B2 | 4/2015 | Wilkins et al. |
| 9,032,451 B2 | 5/2015 | Cansino et al. |
| 2002/0059342 A1 | 5/2002 | Gupta et al. |
| 2003/0025678 A1* | 2/2003 | Lee et al. ................ 345/173 |
| 2003/0046398 A1 | 3/2003 | Buckley et al. |
| 2003/0046401 A1 | 3/2003 | Abbott et al. |
| 2003/0182663 A1 | 9/2003 | Gudorf et al. |
| 2004/0023719 A1 | 2/2004 | Hussaini et al. |
| 2004/0073947 A1 | 4/2004 | Gupta |
| 2004/0120526 A1 | 6/2004 | Hamberg |
| 2005/0081159 A1 | 4/2005 | Gupta et al. |
| 2005/0234958 A1 | 10/2005 | Sipusic et al. |
| 2007/0266304 A1 | 11/2007 | Fletcher et al. |
| 2007/0300185 A1 | 12/2007 | Macbeth et al. |
| 2008/0248845 A1 | 10/2008 | Morgan et al. |
| 2008/0313227 A1 | 12/2008 | Shafton et al. |
| 2009/0055739 A1 | 2/2009 | Murillo et al. |
| 2009/0083383 A1 | 3/2009 | Piper et al. |
| 2009/0154893 A1 | 6/2009 | Vasudevan |
| 2009/0199098 A1 | 8/2009 | Kweon et al. |
| 2009/0221368 A1 | 9/2009 | Yen et al. |
| 2009/0235298 A1 | 9/2009 | Carlberg et al. |
| 2009/0265627 A1 | 10/2009 | Kim et al. |
| 2009/0276475 A1 | 11/2009 | Ramsey et al. |
| 2010/0050129 A1 | 2/2010 | Li et al. |
| 2010/0053164 A1 | 3/2010 | Imai et al. |
| 2010/0069158 A1 | 3/2010 | Kim |
| 2010/0162139 A1* | 6/2010 | Beebe et al. ................. 715/760 |
| 2010/0199232 A1 | 8/2010 | Mistry et al. |
| 2010/0235481 A1 | 9/2010 | Deutsch et al. |
| 2010/0251167 A1 | 9/2010 | DeLuca et al. |
| 2010/0274920 A1* | 10/2010 | Kunii .................... H04L 1/0002 709/233 |
| 2010/0277489 A1 | 11/2010 | Geisner et al. |
| 2010/0318520 A1 | 12/2010 | Loeb et al. |
| 2011/0034129 A1 | 2/2011 | Kim et al. |
| 2011/0078001 A1 | 3/2011 | Archer et al. |
| 2011/0106587 A1 | 5/2011 | Lynch et al. |
| 2011/0111854 A1 | 5/2011 | Roberts et al. |
| 2011/0134030 A1* | 6/2011 | Cho ........................... 345/157 |
| 2011/0158605 A1 | 6/2011 | Bliss et al. |
| 2011/0173214 A1 | 7/2011 | Karim |
| 2011/0190055 A1 | 8/2011 | Leyvand et al. |
| 2011/0190061 A1 | 8/2011 | Takeda et al. |
| 2011/0202350 A1 | 8/2011 | Barnes |
| 2011/0258545 A1 | 10/2011 | Hunter |
| 2011/0273625 A1 | 11/2011 | McMahon et al. |
| 2011/0300930 A1 | 12/2011 | Hsu |
| 2011/0302527 A1 | 12/2011 | Chen et al. |
| 2012/0014558 A1 | 1/2012 | Stafford et al. |
| 2012/0017147 A1* | 1/2012 | Mark ........................... 715/702 |
| 2012/0026166 A1 | 2/2012 | Takeda et al. |
| 2012/0047289 A1 | 2/2012 | Krzystofczyk et al. |
| 2012/0072504 A1 | 3/2012 | Kowalewski |
| 2012/0151345 A1 | 6/2012 | McClements, IV |
| 2012/0151347 A1 | 6/2012 | McClements, IV |
| 2012/0162536 A1 | 6/2012 | Sibilsky et al. |
| 2012/0174155 A1 | 7/2012 | Mowrey et al. |
| 2012/0207342 A1 | 8/2012 | Quail |
| 2012/0231861 A1 | 9/2012 | Champagne et al. |
| 2012/0302340 A1 | 11/2012 | Takemoto |
| 2012/0331496 A1 | 12/2012 | Copertino et al. |
| 2013/0004138 A1 | 1/2013 | Kilar et al. |
| 2013/0007201 A1 | 1/2013 | Jeffrey et al. |
| 2013/0111326 A1 | 5/2013 | Lockhart et al. |
| 2013/0198321 A1 | 8/2013 | Martin et al. |
| 2013/0214994 A1 | 8/2013 | Tsuda et al. |
| 2013/0262575 A1 | 10/2013 | Xiong et al. |
| 2013/0321268 A1 | 12/2013 | Tuck et al. |
| 2014/0020025 A1 | 1/2014 | Anderson et al. |
| 2014/0195690 A1 | 7/2014 | Harrison et al. |

OTHER PUBLICATIONS

Apple Shows Off Time-Shifted GameCenter Multiplayer with Real Racing 3, published on Sep. 12, 2012, available to http://techcrunch.com/2012/09-12apple-shows-off-time-shifted-gamecenter-multiplayer-with-real-racing-3/.

Dmillares, "''How to Connect a Router/Switch Using the Console Port''", Published on: Oct. 16, 2010, Available at:http://www.ehow.com/how_5176394_connect-routerswitch-using-console-port.html.

Final Office Action dated Jun. 23, 2014 in U.S. Appl. No. 13/795,622, 11 pages.

International Search Report with Written Opinion mailed Jun. 25, 2014 in Application No. PCT/US2014/011373, 10 pages.

Transport Layer Security, Published on: Jan. 16, 2013, Available at:http://en.wikipedia.org/w/index.php?title=Transport%20_Layer%20_Security&oldid=533283246.

Canvas element, Published on: Jan. 16, 2013, Available at:http://en.wikipedia.org/w/index.php?title=Canvas%20element&oldid=533346213.

IP forwarding algorithm, Published on: Nov. 12, 2012, Available at:http://en.wikipedia.org/w/index.php?title=IP_forwarding_algorithm&oldid=522576662.

"International Search Report & Written Opinion for PCT Patent Application No. PCT/US2013/042547", Mailed Date: Dec. 13, 2013, Filed Date: May 24, 2013, 11 Pages.

Malfatti et al., Using Mobile Phones to Control Desktop Multiplayer Games, In Proceeding of 9th Brazilian Symposium on Computer Games and Digital Entertainment, Nov. 8, 2010, 7 pages.

Vajk, et al., Using a Mobile Phone as a Wii-like Controller for Playing Games on a Large Public Display, Retrieved on Oct. 12, 2012, available at http://downloads.hindawi.com/journals/ijcgt/2008/539078.pdf.

(56) References Cited

OTHER PUBLICATIONS

Non-Final Office Action dated Jan. 2, 2014 re U.S. Appl. No. 13/795,622.
Thurana, Jerffry, "How to Easily Activate Two Finger Scroll in Windows Laptops", Published on: Mar. 23, 2010, Available at: http://www.makeuseof.com/tag/easily-activate-finger-scroll-windows-laptops/.
Rahimi, David, "How to Enable and Use TouchWiz 4.0 Motion Controls", Published on: May 7, 2012, Available at: http://www.phonebuff.com/2012/05/enable-touchwiz-4-0-motion-controls/.
Buchanan, Matt, "Video: Samsung Instinct Lets You Browse Web Pages with Tilt Navigation (Plus, It's Under $300)", Published on: Apr. 2, 2008, Available at: http://gizmodo.com/374937/video-samsung-instinct-lets-you-browse-web-pages-with-tilt-navigation-plus-its-under-300.
"The Battle for Control of Your Living Room TV Has Not Been Won", Published on: Feb. 2, 2012, Available at: http://www.wired.co.uk/news/archive/2012-02/02/the-battle-for-dominance-in-web-tv?page=all.
Non-Final Office Action dated Oct. 23, 2014 in U.S. Appl. No. 13/725,925, 21 pages.
Non-Final Office Action dated Dec. 26, 2014 in U.S. Appl. No. 13/795,622, 14 pages.
Non-Final Office Action dated Jan. 7, 2015 in U.S. Appl. No. 13/724,360, 23 pages.
Notice of Allowance dated Jul. 1, 2015 in U.S. Appl. No. 13/725,925, 14 pages.
Final Office Action dated Jul. 13, 2015 in U.S. Appl. No. 13/724,630, 20 pages.
Non-Final Office Action dated Aug. 3, 2015 in U.S. Appl. No. 13/744,100, 31 pages.
Notice of Allowance dated Mar. 3, 2016 in U.S. Appl. No. 13/744,100, 5 pages.
Non-Final Office Action dated Apr. 4, 2016 in U.S. Appl. No. 13/724,630, 18 pages.
International Preliminary Report on Patentability dated Dec. 11, 2014 in Application No. PCTUS2013/042547, 8 pages.
Final Office Action dated Sep. 25, 2015 in U.S. Appl. No. 13/795,622, 13 pages.
U.S. Appl. No. 13/724,630, filed Dec. 21, 2012, Shiraz Cupala, et al.
U.S. Appl. No. 13/725,925, filed Dec. 21, 2012, Szymon Piotr Stachniak, et al.
U.S. Appl. No. 13/744,100, filed Jan. 17, 2013, John Darren Elliot, et al.
U.S. Appl. No. 13/795,622, filed Mar. 12, 2013, Kathleen Patricia Mulcahy, et al.
U.S. Appl. No. 14/856,281, filed Sep. 16, 2015, Szymon Piotr Stachniak, et al.
Final Office Action dated Oct. 25, 2016 in U.S. Appl. No. 13/724,630, 20 pages.

* cited by examiner

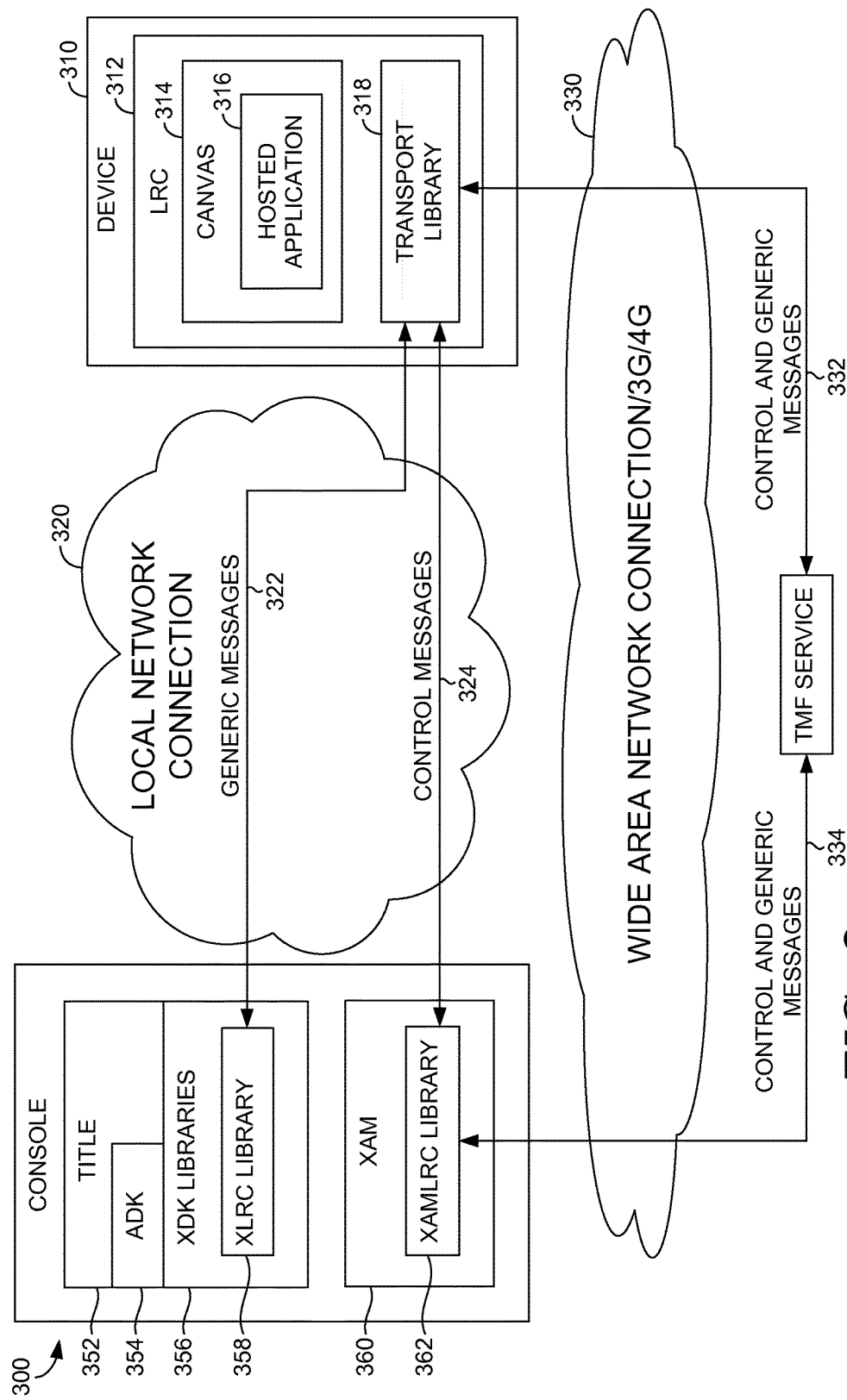

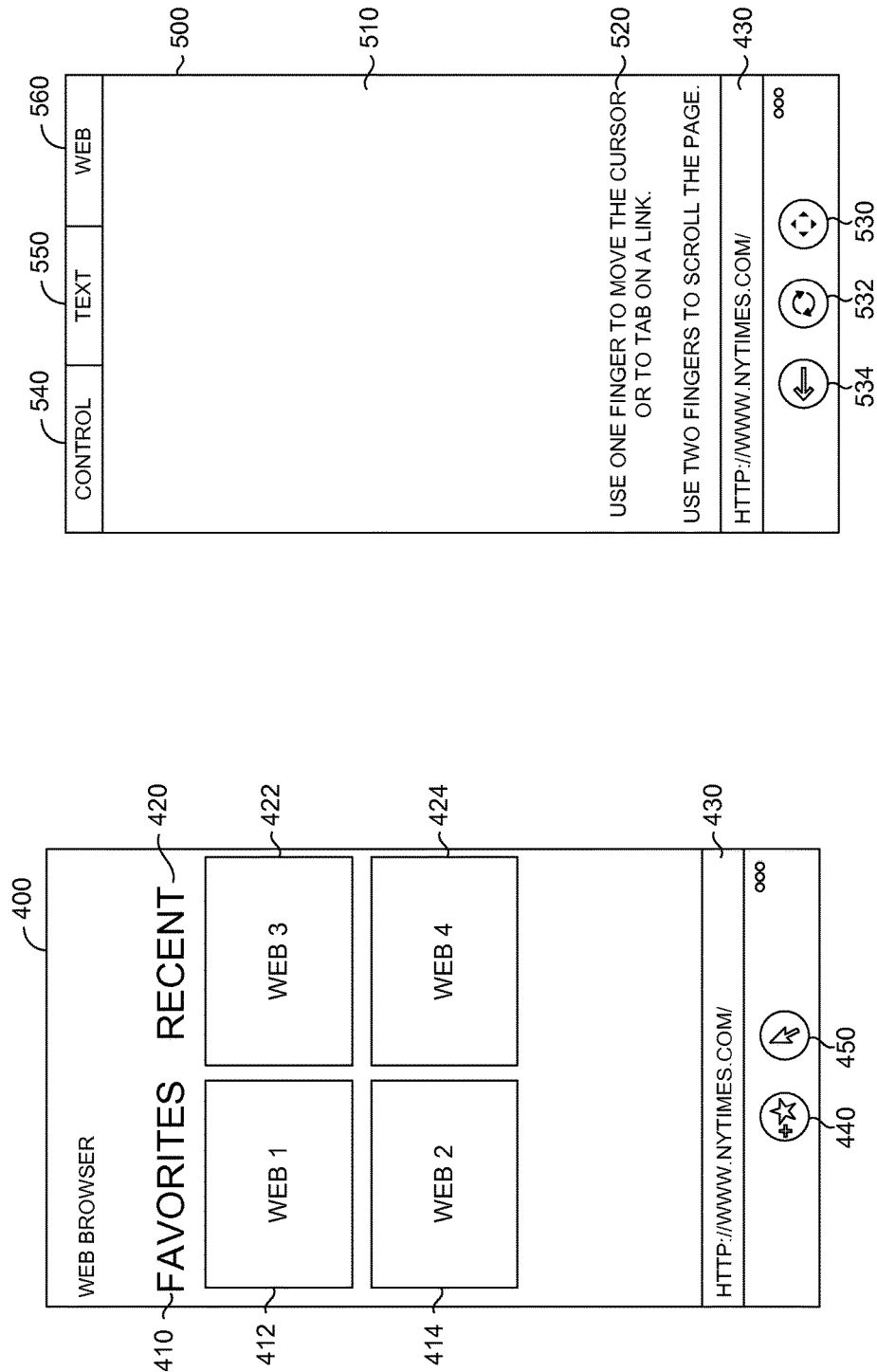

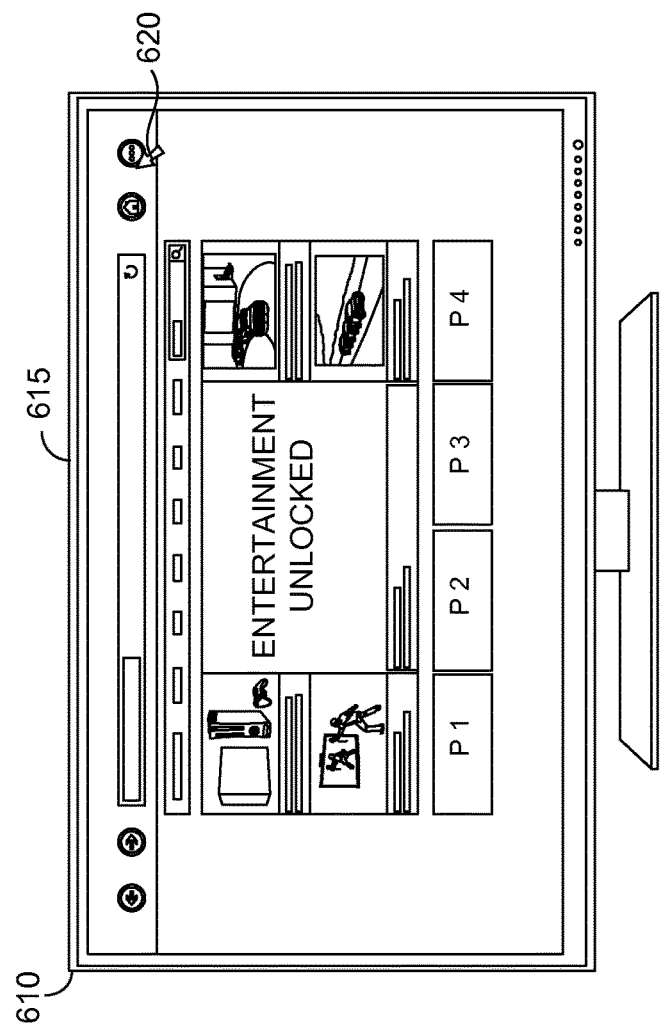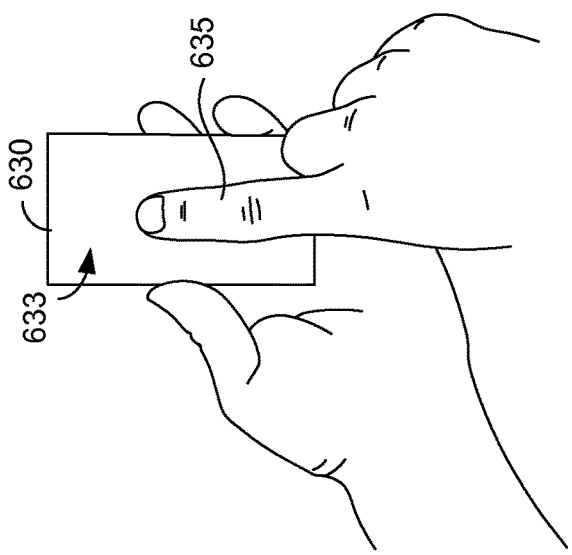
FIG. 6.

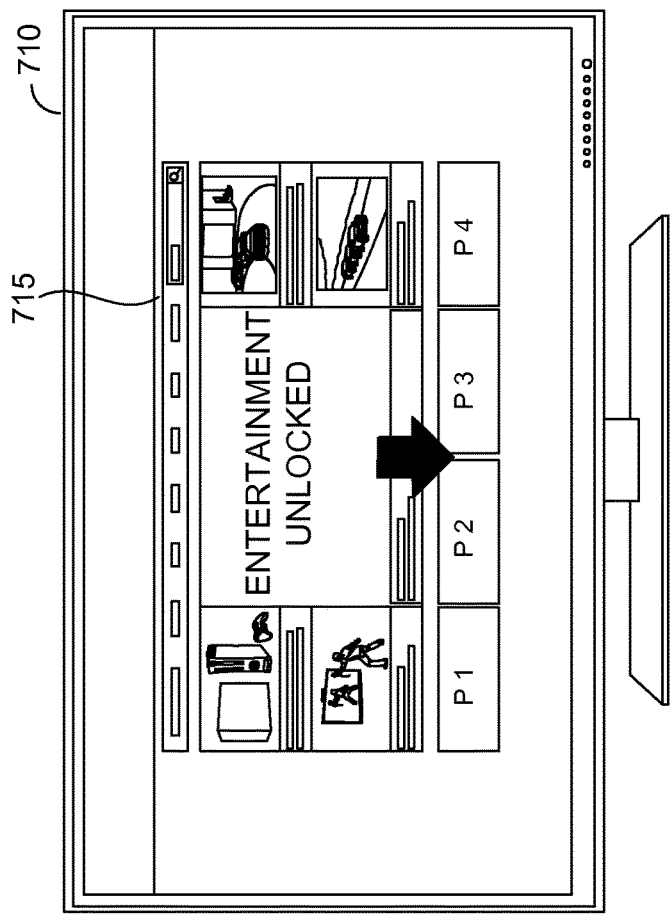
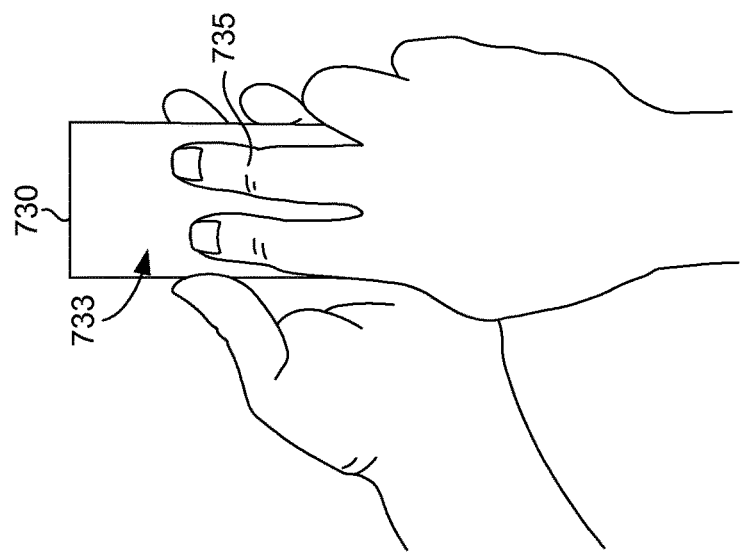
FIG. 7.

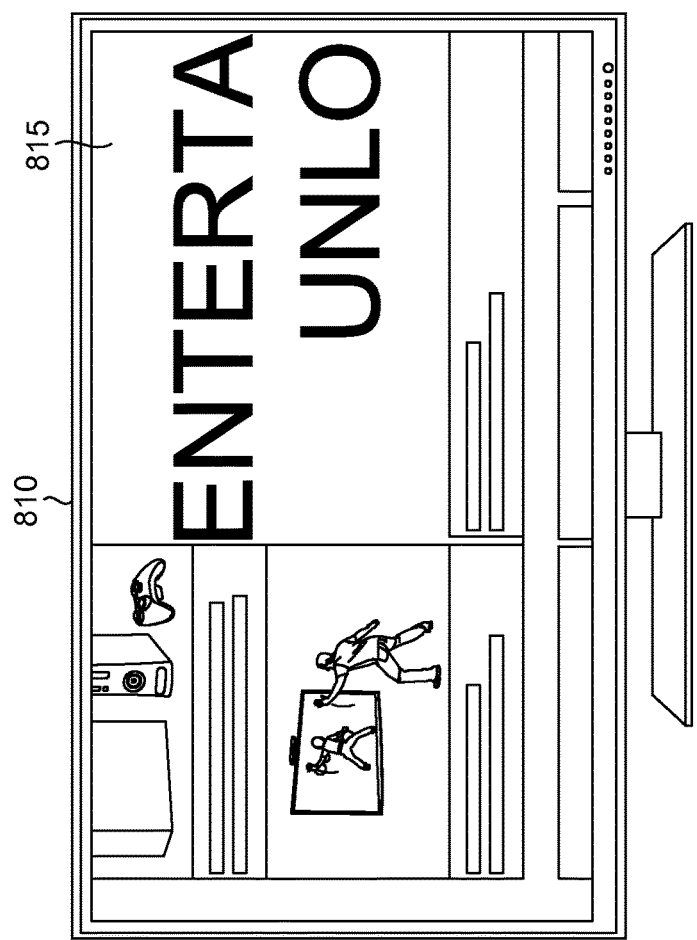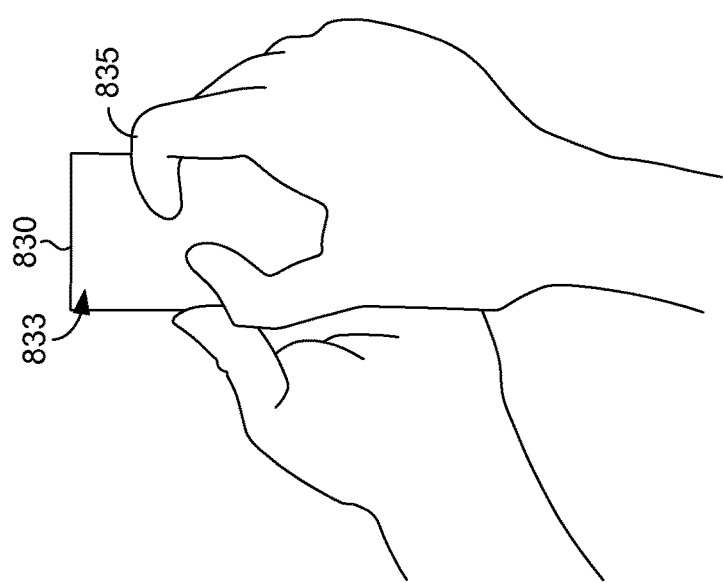
FIG. 8.

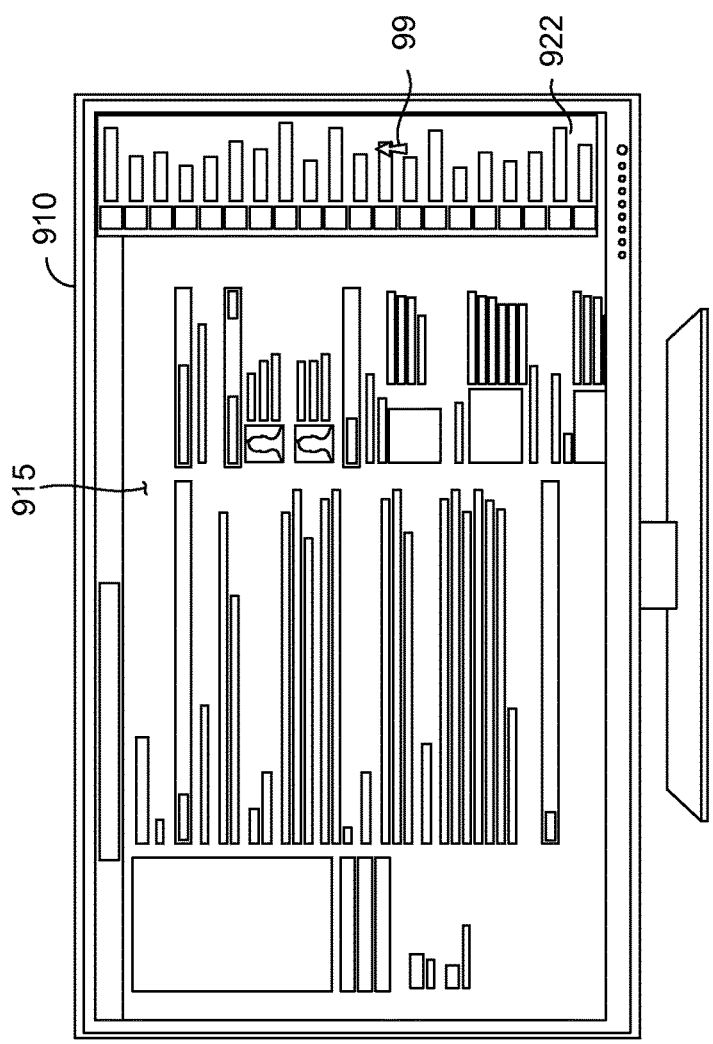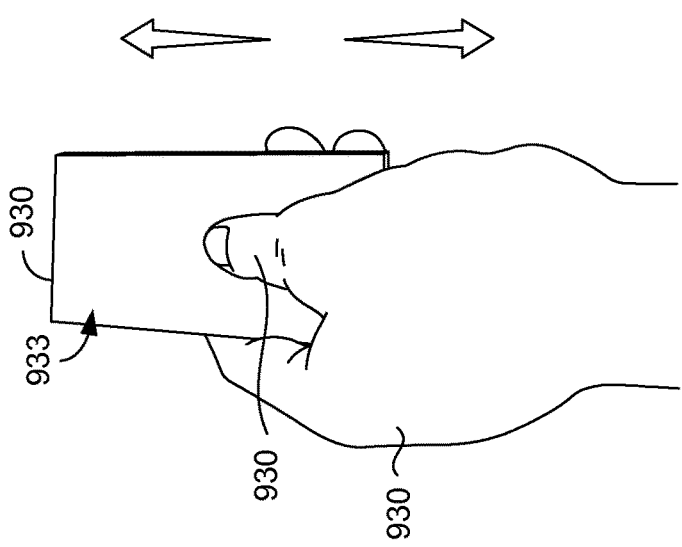
FIG. 9.

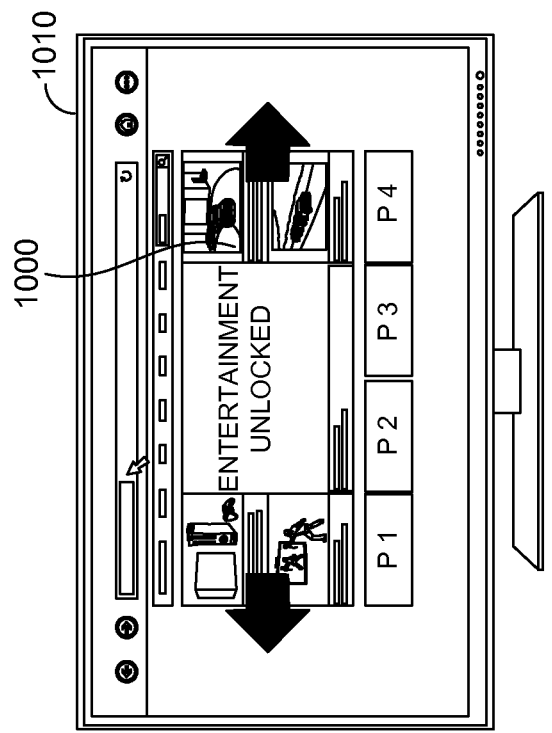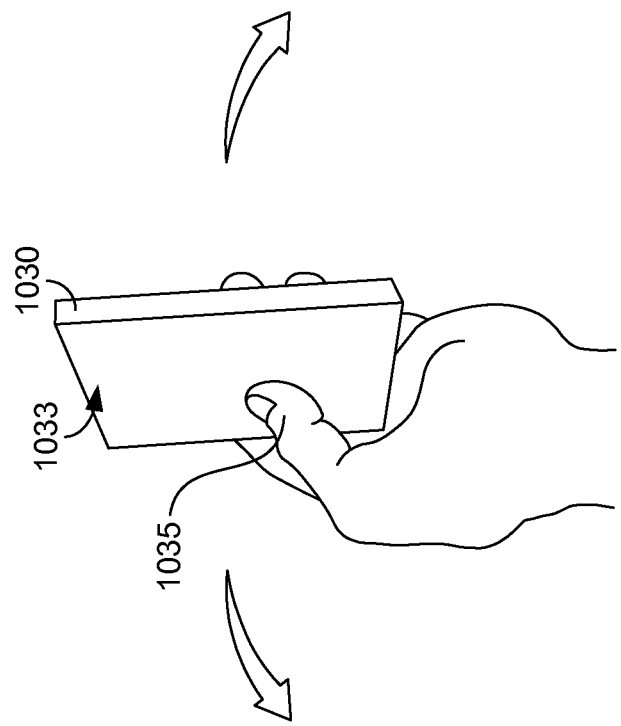
FIG. 10.

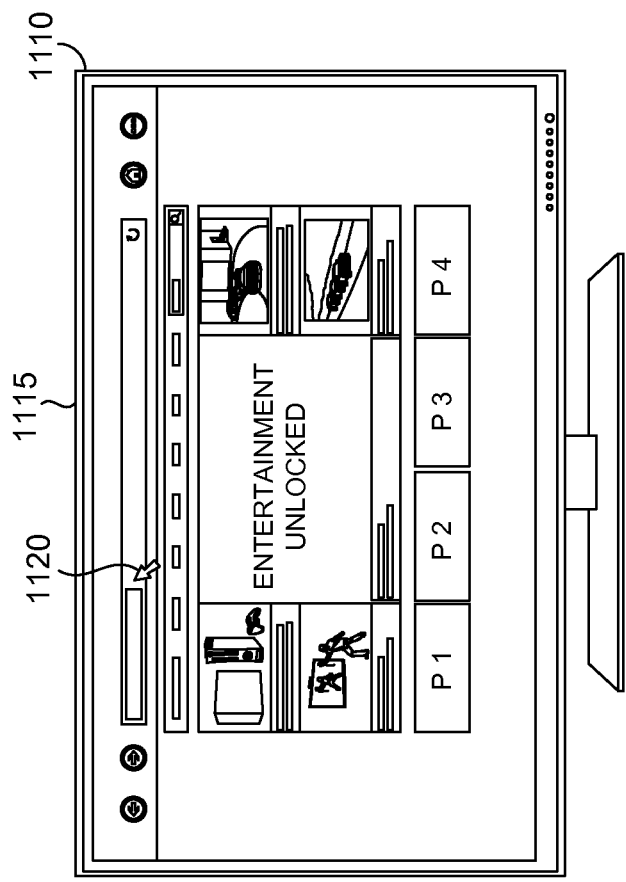
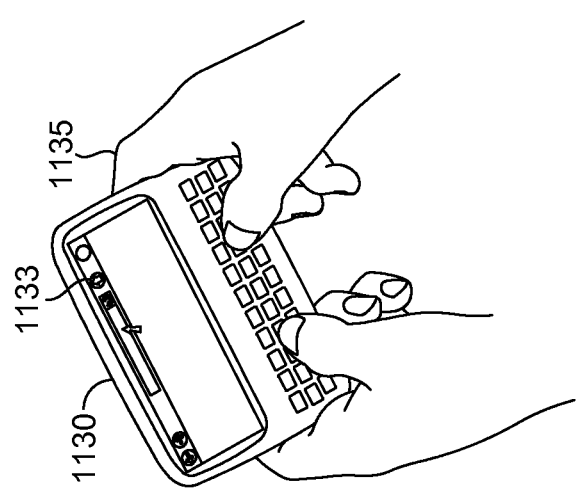
FIG. 11.

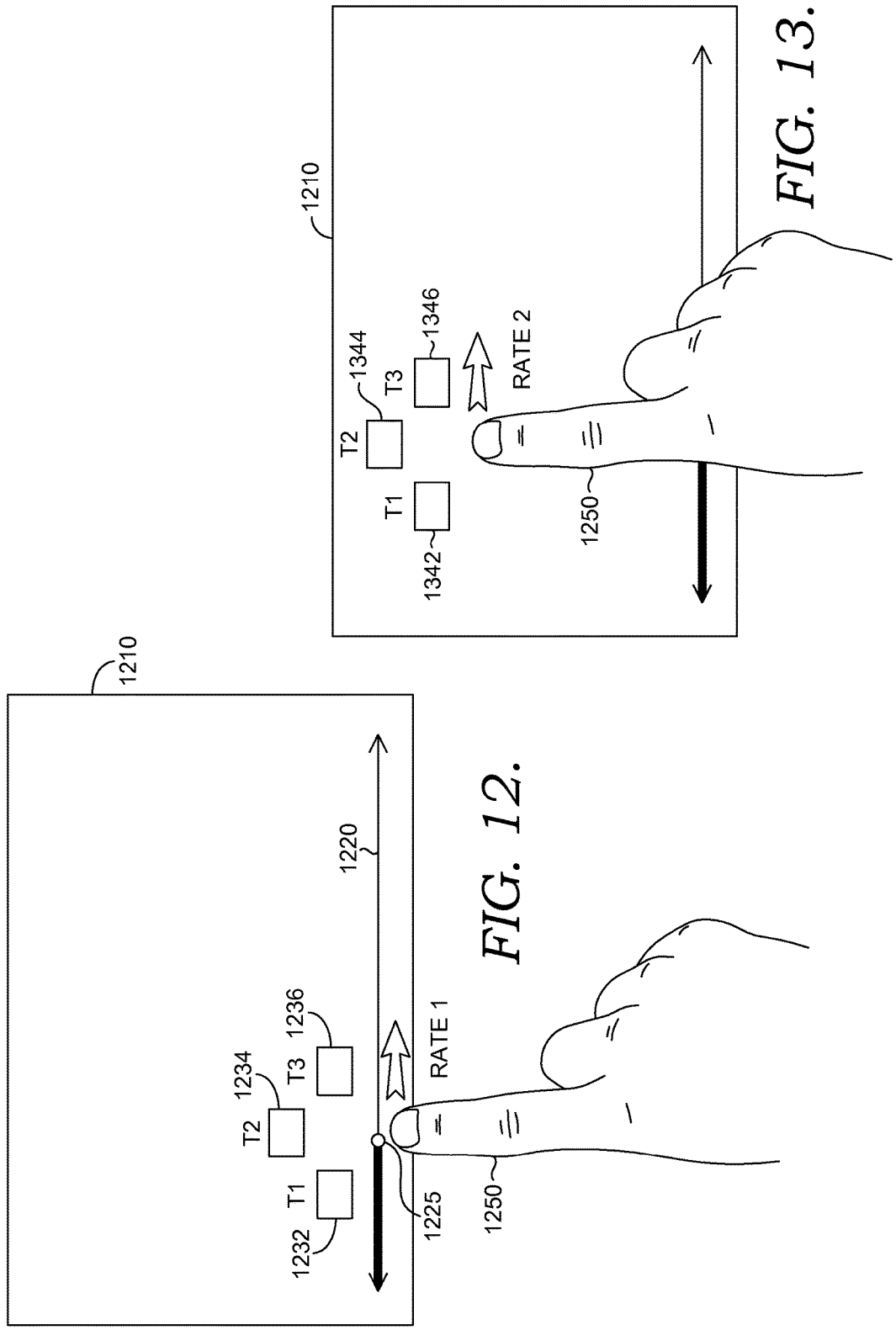

CONTROL OF REMOTE APPLICATIONS USING COMPANION DEVICE

CROSS-REFERENCE TO RELATED DOCUMENTS

This application claims the benefit of priority to U.S. Provisional Application No. 61/654,638, filed Jun. 1, 2012, and titled "Companion Experiences", the entirety of which is hereby incorporated by reference.

BACKGROUND

Increasingly, televisions are used to display interactive content. For example, primary devices such as game consoles, digital video recorders (DVR), and the televisions will present web browser interfaces and media selection interfaces that can require complex navigation. In particular, these interfaces may require a user to scroll various selectable objects and to select an object. The interfaces may also require textual input.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention utilize the touch screen display on a companion device to control an application running on a primary device. For example, the touch screen on a slate may be used to control a web browser application running on a game console. Using the touch screen display on the companion device, the user may push the cursor around the browser interface and select objects. The touch screen may enable various gestures that allow the user to scroll, pan, or adjust the zoom of the display.

Embodiments of the present invention provide a similar control experience using companion devices with different size screens and operating systems. Embodiments of the present invention may communicate touch data from the companion device to the primary device. The primary device then interprets the touch data in a consistent way across devices to derive an intended control input. The graphical user interface and application state are then manipulated according to the derived input.

Initially, when a communication session is set up between a companion device and a primary device, information about the companion device may be communicated to the primary device. For example, the screen size, operating system, and manufacturer of a device may be communicated to the primary device. The primary device may have a table of characteristics describing different types of devices. Additionally, when an application is opened on the primary device, the application state may be communicated from the primary device to the companion device. In response, the companion device may update the control interface displayed on its touch screen display. For example, a browser application may communicate the current URL in a URL selection field. As explained in more detail, a user may access a touch screen keypad and enter a desired URL directly into the companion device.

BRIEF DESCRIPTION OF THE DRAWINGS

Embodiments of the invention are described in detail below with reference to the attached drawing figures, wherein:

FIG. 3 is a diagram of a computing system architecture for generic messaging between a game console and a companion device, in accordance with an embodiment of the present invention;

FIG. 4 is a diagram of an interface displayed on a companion device showing a web hub that is able to control a game console's web browser, in accordance with an embodiment of the present invention;

FIG. 5 is a diagram of an interface displayed on a companion device showing a control interface that is able to control a game console's web browser, in accordance with an embodiment of the present invention;

FIG. 6 is a diagram showing a cursor on the game console's web browser being controlled by dragging a finger across the touch surface of the companion device, in accordance with an embodiment of the present invention;

FIG. 7 is a diagram showing a user panning down a page displayed on the game console's web browser by dragging two fingers across the touch surface of the companion device, in accordance with an embodiment of the present invention;

FIG. 8 is a diagram showing a user zooming into a page displayed on the game console's web browser by pinching two fingers across the touch surface of the companion device, in accordance with an embodiment of the present invention;

FIG. 9 is a diagram showing a user scrolling a portion of a page displayed on the game console's web browser by tilting the companion device up and down, in accordance with an embodiment of the present invention;

FIG. 10 is a diagram showing a user horizontally scrolling a portion of a page displayed on the game console's web browser by swiveling the companion device, in accordance with an embodiment of the present invention;

FIG. 11 is a diagram showing a user typing into a text box on a page displayed on the game console's web browser by typing on a touch screen keyboard on the companion device, in accordance with an embodiment of the present invention;

FIG. 12 is a diagram showing a user fast-forwarding a movie playing on the game console by sliding their finger along a playhead displayed on the companion device, in accordance with an embodiment of the present invention;

FIG. 13 is a diagram showing a user slowly fast-forwarding a movie playing on the game console by sliding their finger above a playhead displayed on the companion device, in accordance with an embodiment of the present invention;

DETAILED DESCRIPTION

Figure 1:
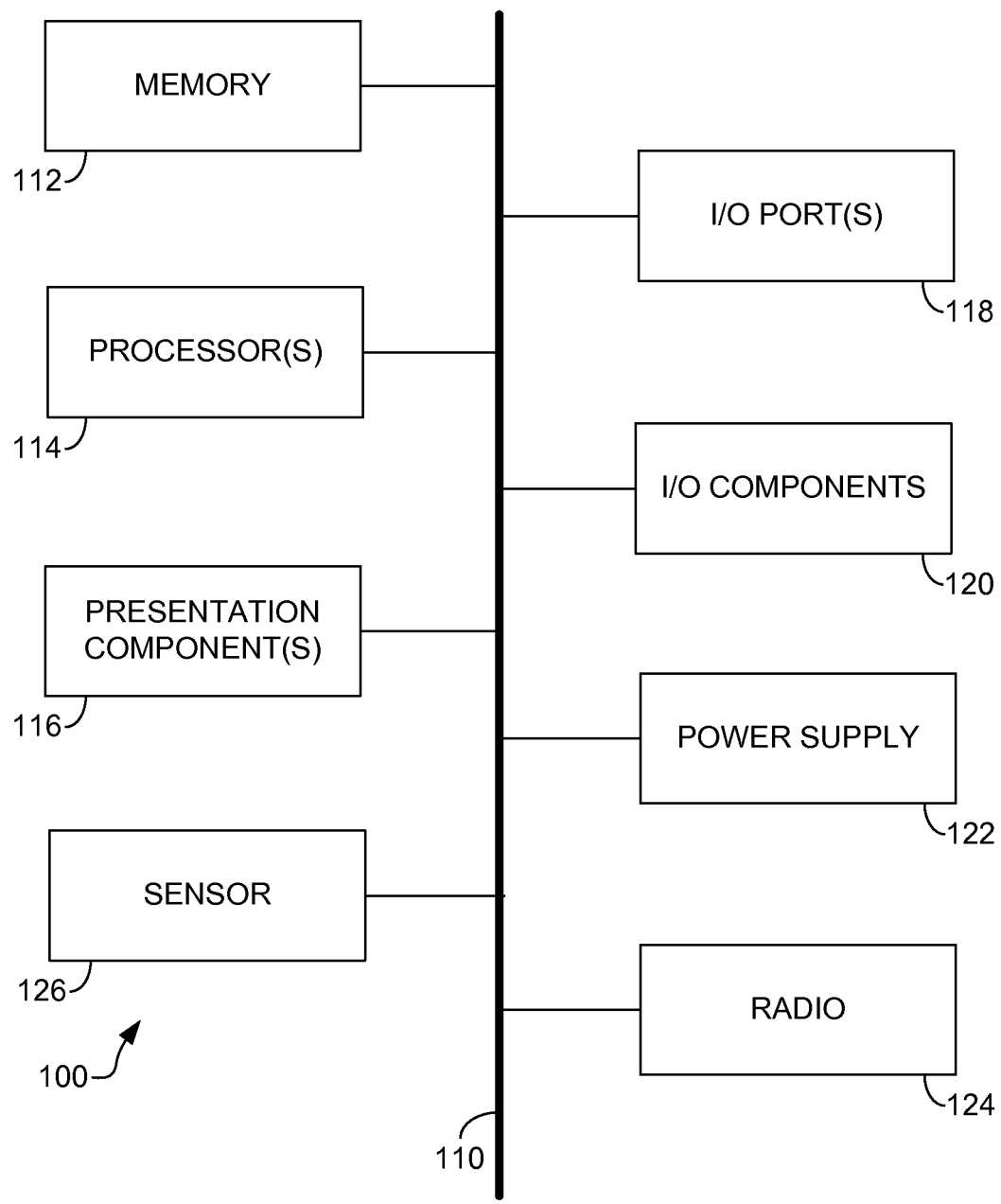
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention utilize the touch screen display on a companion device to control an application running on a primary device. For example, the touch screen on a slate may be used to control a web browser application running on a game console. Using the touch screen display on the companion device, the user may push the cursor around the browser interface and select objects. The touch screen may enable various gestures that allow the user to scroll, pan, or adjust the zoom of the display.

Embodiments of the present invention provide a similar control experience using companion devices with different size screens and operating systems. Embodiments of the present invention may communicate touch data from the companion device to the primary device. The primary device then interprets the touch data in a consistent way across devices to derive an intended control input. The graphical user interface and application state are then manipulated according to the derived input.

Initially, when a communication session is set up between a companion device and a primary device, information about the companion device may be communicated to the primary device. For example, the screen size, operating system, and manufacturer of a device may be communicated to the primary device. The primary device may have a table of characteristics describing different types of devices. Additionally, when an application is opened on the primary device, the application state may be communicated from the primary device to the companion device. In response, the companion device may update the control interface displayed on its touch screen display. For example, a browser application may communicate the current URL in a URL selection field. As explained in more detail, a user may access a touch screen keypad and enter a desired URL directly into the companion device.

In one embodiment, the user experience is normalized across multiple devices by allowing the primary device to interpret the touch data. Initially, the touch data is received by the companion device and normalized by converting pixel coordinates to a percentage of the screen's width and height. For example, a touch point in the middle of the screen could be described as (0.5, 0.5). In this case, both the X and Y values are equal to 0.5. The normalized value may be calculated by dividing the x and y coordinates of the touch point by the companion's screen height and width, respectively. This normalized touch data is communicated to the primary device.

The normalized touch data may be communicated at a frame rate appropriate for consumption by the primary device such as 30 frames per second. Ability of the primary device to consume the touch data along with network latency characteristics may be considered to dynamically adjust the frame rate at which touch data is communicated.

Embodiments of the invention will describe touch data in different forms. The term "touch data" may encompass all forms of touch data including raw, normalized, scaled, and optimized. Raw touch data is the information generated by the touch screen driver. The normalized touch data is adjusted based on the height and width of the companion device's display. The scaled touch data takes the normalized data as input and scales it to a display screen to which the primary device outputs content. Finally, the optimized touch data is a further adjustment of the scaled data based on a template interface. Each of these types of touch data and their uses are described in more detail below.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, radio 124, and sensor 126. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits are receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Companion Environment

Figure 2:
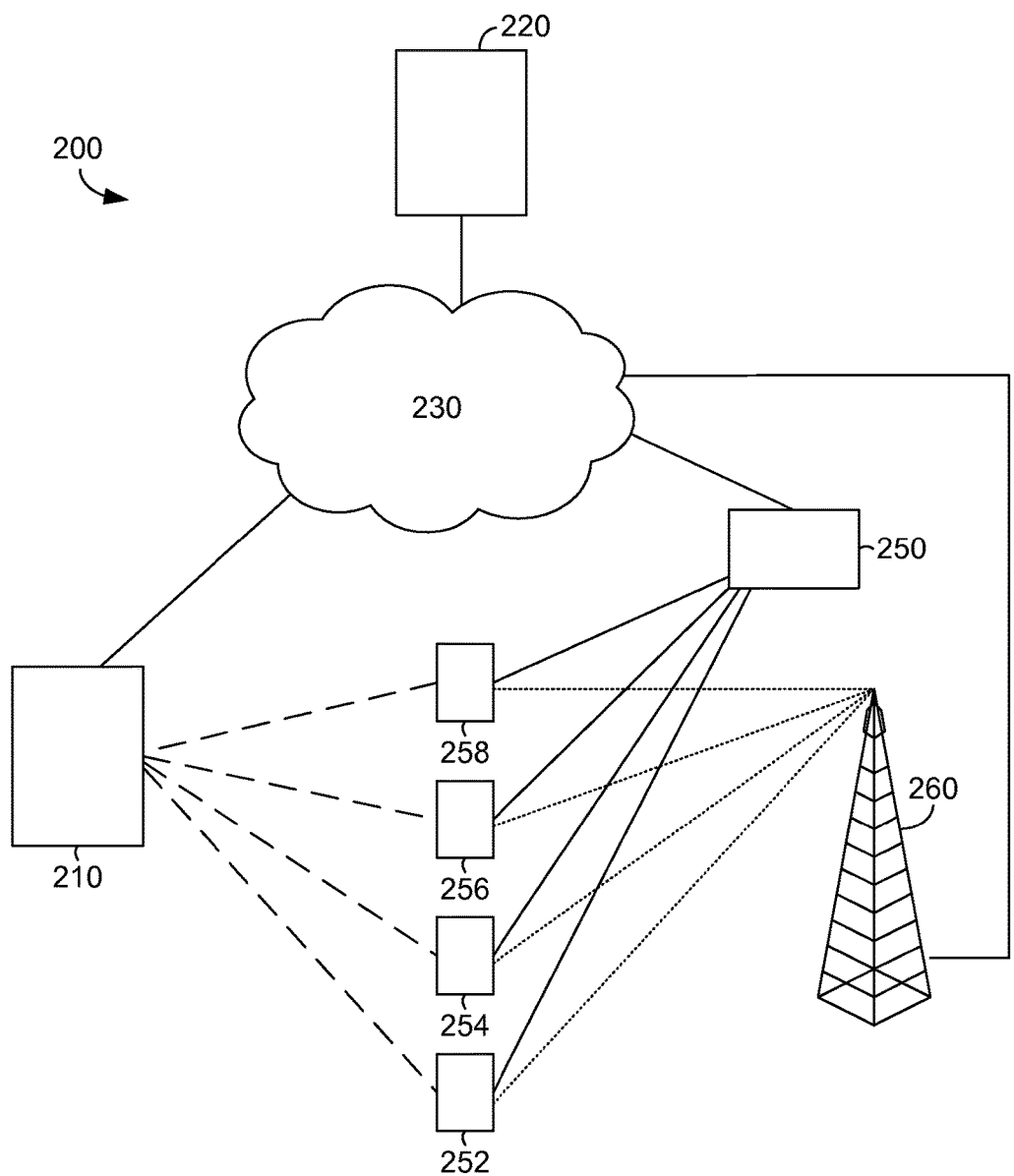
FIG. 2 is a diagram illustrating a variety of communication mediums between game consoles, game services, and companion devices, in accordance with an embodiment of the present invention.

Turning now to FIG. 2, a networked operating environment 200 comprising multiple computing devices that can provide a companion experience is shown, in accordance with embodiments of the present invention. The environment 200 includes a primary device 210, companion devices 252, 254, 256, and 258, a wireless router 250, a base station 260, a network 230 and a companion experience server 220. These devices are merely exemplary and are not intended to be limiting.

The primary device 210 may be a game console, media console, or other suitable computing device that presents titles. Titles may be games, movies, applications, music, videos, television shows, and other media content. The game console may be coupled to a display, such as a television.

The companion devices 252, 254, 256, and 258 are computing devices. A companion device, as used in this application, is a personal computing device that provides a second display. Examples include laptops, PCs, netbooks, smartphones, e-readers, PDAs, and tablets. A companion experience allows the user to interact with content related to media playing on a primary device 210 through interfaces on the companion device. The companion experience may also allow the user to control the media presentation through an interface on the companion device.

The companion experience server 220 facilitates companion experiences by providing companion content, companion applications, registering and authenticating companion devices, facilitating communications between primary devices and companion devices, and performing other tasks. The companion experience server may be accessed via a wide-area network, such as the Internet.

The companion devices 252, 254, 256, and 258 may communicate directly with the primary device 210 via Bluetooth or through a wired connection. The companion devices could also communicate over a local wireless network generated by the wireless router 250. These connections could be direct or they could be routed through the companion experience server. The companion devices could also communicate with the primary device via a data service facilitated by base station 260. The base station 260 could route communications to the primary device through whatever communication to the Internet 230 the primary device is using. The base station 260 could also be in direct communication with the primary device, if the primary device is using the same data service.

Communication Session Between Primary Device and Companion Device

Turning now to FIG. 3, an exemplary diagram 300 is illustrated for generic companion-messaging between a device 310 and a console 350, in accordance with an embodiment of the present invention. The device 310 includes the LRC 312, the canvas 314, hosted application 316, and transport library 318. The console 350 includes the title 352, ADK 354, XDK libraries 356, XLrc library 358, XAM 360, and XAMLRC library 362. The title 352 may include console-based games and applications—written using either the XDK 356 or ADK 354. The ADK 354 is the console's application development kit. The XDK 356 is the console's development toolkit and includes the XLRC 358, which is the XDK 356 title library that implements the LRC 312 functionality and APIs. The XAM 360 is the system services and includes the XAMLRC 362 library that implements LRC 312 functionality and APIs. The XLrc library 358 refers to a console 350 (e.g. XBOX® provided by Microsoft Corporation of Redmond, Wash.) developer toolkit ("XDK") title library that titles need to link against to enable companion functionality. Canvas 314 is the container for hosting, title specific, hosted applications. The hosted application 316 may be a HTML5 page and its dependent CSS and JavaScript files, hosted on the developer's servers. Lastly, Transport library 318 includes both the existing TMF proxy for sending generic messages 322 and control messages 324 to support generic companion-messaging.

The components of the console 350 and the device 310 provide an encrypted, communication channel between a title running on the console 350 and the LRC hosted application 316. The LRC 314 may also make use of the channel. The channel supports bidirectional, message-based communication with several delivery options: reliable, unreliable, and unreliable multicast/broadcast. Communication using this channel may be routed over the local network connection whenever possible on a per device basis. When the device 310 cannot connect directly to the console 350 over the local network connection, messages are delivered through a cloud-based service TMF service 340 in FIG. 3. Titles and hosted applications can determine from per-client data whether their connection is local, implying low latency. Embodiments support simultaneously connection of multiple companion platforms to the console 350 at any given point in time, regardless if they connected over the local network connection or through the TMF service 340. A hosted application may be a web based application loaded in an embedded browser that adds companion experiences to console based titles.

The generic companion-messaging session, automatically pairs a hosted application 316 on the companion platform with a title 352 on the console 350 based on a generic companion-messaging abstraction layer that facilitates platform-independent communication between the hosted application 316 and the title. Generic companion-messaging requires special codes to the console system services library ("XamLrc"), the title library that implements LRC functionality and APIs ("XLrc"), and the LRC Transport libraries. In one embodiments, the current XamLrc library is expanded to support multiple, connected devices over TCP. In another embodiment, only UDP is used with added reliability. In another embodiment, all code related to generic companion-messaging runs in the console system services ("XAM"), which would enable for easier protocol upgrades as there would be no generic companion-messaging protocol specific code running in title space. In another embodiment, the generic companion-messaging codebase is moved into the base platform-side API (e.g., XLrc library) running in title space. The abstraction layer also particularly supports the HTML Canvas 314; Canvas 314 is the container for hosting, title specific, hosted applications. The companion platform-side API provides abstraction for the generic companion-messaging to support dynamic scriptable rendering on the hosted application. The hosted application 316 may be a HTML5 page and its dependent CSS and JavaScript files, hosted on the developer's servers. The canvas is a companion platform control encapsulating the web browser control, JavaScript bridge, and object model exposed through the bridge to the HTML5 hosted in the control.

As part of the implementation of generic companion-messaging, a generic companion-messaging session (hereinafter "title message session") is implemented. These title message sessions are created on demand when a hosted application successfully connects to a title over the local network connection 320 or TMF service 340 via the wide area network 330. The TMF sends control and generic messages 332 and 334 between the device 310 and the console 350. Generic messages can include other title specific messages (e.g. touch and gesture events) delivered over the title to hosted application channel or TMF service 340. Generic messages may be title specific messages delivered over the title to hosted application channel or a TMF service 340. Simply, a title message session pairs the title and the hosted application together so that the XLrc 358 and XamLrc 362 can properly route and encrypt messages. A title message session may be initiated in association with a SDP ("Service discovery protocol"). An SDP is a network protocol which allows automatic detection of devices and services offered by these devices on a computer network. The SDP allows the console 350 to advertise a connection on the network and the device 310 to discover the network services of the console 350. Upon the configuration of the network configuration the title messaging session may begin initialization, and using the generic companion-messaging session, titles may send messages to a hosted application running on a specific client after they have received a notification indicating that specific client has connected implying a title message session has been established.

Both the device 310 and the console 350 need to be aware of the transport they employ for communication with one another. The device 310 transport library 318 attempts to establish a local network connection and therefore knows if it was successful. The console 350 is made aware of a local network connection when the device 310 successfully connects and then sends a title message session initialization message (e.g., XLRC_MESSAGE_CONNECT). Regardless, of the transport, the device 310 sends this message to initialize the title message session. Additionally, both the title 352 and the hosted application 316 can determine each devices transport when receiving information about each client.

One embodiment of generic companion-messaging uses reliable, point-to-point message delivery. The underlying transport is TCP for local network 320 connected devices. However, APIs may support unreliable delivery as well as broadcast addressing. Unreliable delivery may be used over UDP for local network 320 connected devices. Titles and hosted applications are expected to be aware that when messages are routed through TMF service 340 that delivery will be implemented using slower, reliable mechanisms. Lastly, broadcast addressing may be supported from the console 350 to all devices. Over reliable transports, this involves sending the message to each device 310 individually over TCP or the TMF service 340 depending on connectivity. Broadcast addressing over unreliable transports may be implemented using UDP multicast and the TMF service for those devices that are not connected directly.

The generic message may take different formats. In one embodiment, the message format supports three headers, one trailer, and several payloads. These message formats may include any additional framing that TMF service 340 adds for messages delivered using its service. The three headers may all share a common set of fields. To support generic companion-messaging a MessageKind (LRC_MESSAGE_KIND_GENERIC) is included in the message library. In one embodiment, the only valid data to be passed for a generic message is a Java Script Object Notation ("JSON") string, indicated with a new MessageType (LRC_MESSAGE_JSON).

Sequence numbers for LRC messages may be kept separately for control messages and generic messages. Simply, they originate in two different libraries on the console 350 and similarly different modules on the device 310. Keeping the sequence numbers separate allow the existing body of code dealing with matching a response with a request to continue to work unchanged.

The generic companion-messaging incorporates secure transport of messages so the console 350, devices 310, and TMF service 340 work together to provide a trustworthy system. From a security standpoint the device 310 is completely un-trusted when communicating with the console 350. The reverse is also true; the console 350 is completely un-trusted when communicating with the device 310. Additionally, it may be assumed that there are compromised devices on the local network 320 that are able to intercept all local network traffic. Service credentials (e.g., user account) are used to authenticate the user. Based on these credentials, a device 310 is allowed to rendezvous with a console 350 when the user on the companion platform is already signed into the console 350.

Given these constraints, traffic to and from the TMF service 340 is over HTTPS. The TMF service 340 may generate all encryption and signing keys. In one embodiment, the TMF service 340 generates a 128-bit HMAC_SHA1 key for signing all messages, ensuring no message has been tampered with. Additionally, the TMF service 340 generates a 128-bit AES key for encrypting all broadcast local network messages as well as per-device initialization messages. All clients (console and devices) receive these session-level signing and encryption keys when joining a session. These keys are changed and redistributed whenever a user on the console 350 signs out. To support per-device privacy, whenever a client joins a session it also receives a 128-bit AES key from the TMF service 340. The console 350 also receives this same key for each device 310 in the session. When a user signs out on the console 350, the keys associated with devices in the session where the same user was signed in are discarded and no longer used. A per-device encryption key allows the same user to sign in on multiple devices.

In an effort to mitigate some of the risk in having un-trusted, opaque data consumed by titles or hosted applications the contents of messages are accessible through a set of hardened function calls. The JSON protocol may be used for all generic message data. On the console 350, this will be exposed to the title developer through the XJSON Parser API. In the alternative, a concatenation of binary fields serialized using an API similar to .NET's BinaryReader may be used. The data size may be set to 1K bytes. Titles are written in such a way that if they are compromised on user's console then they can be revoked.

Remote Application Control

Remote application control is a companion application that allows a user to command and control experiences generated by an application running on a primary device. Web browsers, games, and streaming media applications are examples of applications running on a primary device that may be controlled using the companion device. Interfaces associated with each of these primary devices may be displayed on a television or other device coupled to the primary device. Though illustrated in subsequent examples as a way to navigate a browser, the techniques described below could also be used to navigate other interfaces shown on the remote display.

The companion device runs a control application that is associated with a control interface. A control interface is displayed on the companion device's touch screen display. The control application exchanges information with the primary device over a communication channel. A counterpart control application may be running on the primary device to interpret data received from the companion device. The counterpart control application converts data received from the companion device to commands that the application consumes.

Turning now to FIG. 4, an exemplary web hub 400 is displayed on a companion device, in accordance with an embodiment in the present invention. The web hub 400 is an exemplary control interface for a web browser. In some embodiments, different applications running on the primary device may have different control interfaces. In another embodiment, a single control interface on the companion device controls multiple applications running on the primary device. FIGS. 4-13 describe the primary device as a game console, but embodiments of the invention are not limited to implementation on a game console.

The web hub 400 may be generated by a companion application running on a companion device, such as a smart phone or tablet. The web hub 400 may be surfaced by the user specifically selecting a web hub icon or otherwise providing explicit instruction to open the web hub 400 interface. In another embodiment, the web hub 400 is opened when the browser is opened on the game console and the companion device is connected to the game console.

The web hub 400 includes a favorites section 410. In one embodiment, the headings of the favorites section 410 is selectable and will reveal additional favorites in a separate screen or pop up window that the user can scroll through on the companion device. The user's favorite may also be shown simultaneously on a display connected to the game console. Under the favorites heading 410, links to the user's top favorites may be included. In this case, link 412 and link 414 allow the user to navigate directly to two of their frequently used favorites. A user may have numerous selectable favorites. The links shown in the favorites may be included based on the frequency of use, by user selection, or by some other method.

The web hub 400 also includes a recently viewed heading 420 under which links 422 and 424 are depicted. The user may navigate directly to recently viewed web sites by selecting either of the links. Additional recently viewed sites may be shown in response to selecting the recently viewed 420 sections heading. The additional links may be displayed on the companion device and/or on the display connected to the game console. In one embodiment, the favorite and recently viewed entry points are mutually exclusive. In other words, recently viewed sites appearing under favorites do not appear again under the recently viewed heading or vice-versa.

The web hub 400 includes an address bar 430. The address bar depicts the web address of the web site currently shown in the game console's browser. This illustrates that the web hub and content shown on the web hub do not need to be shown on the game console's web browser. The web hub 400 may be shown at the same time a web site is being viewed in the game console's web browser. In one embodiment, upon selecting the address bar 430 the user may directly input a web address to which the game console's web browser is to navigate. The web hub may remain displayed after the new address is entered into the address bar 430. In other words, the web hub display may remain mostly unchanged while the game console's browser navigates to a new web site. Upon selecting the address bar 430, the user may use a keyboard on the companion device to type the desired web address. The key board maybe a hard keyboard or a soft keyboard. In another embodiment, the companion device's own voice recognition program may be used to populate text into the address bar 430. The web browser communicates the new URL upon navigating to a new website. The new URL is displayed in the address bar 430.

The favorite selection icon 500 500 440 allows the user to designate a new favorite that is added to the user's favorite collection. In another embodiment, selecting the favorites icon 440 opens a favorite selection interface associated with the console's web browser.

Selecting the control icon 450 activates several control functions that allow the user to control the web browser using the companion device. Upon selection of the control icon 450 a control user interface is displayed on the companion device.

FIG. 5 depicts a control interface 500 that allows the user to interact with the web browser displayed by the game console. The control interface 500 includes a gesture area 510 where the user can make touch gestures that manipulate the game console's browser. Exemplary gestures are depicted in FIGS. 6-10. These will be described in more detail subsequently. The instruction area 520 provides instructions explaining how to control the browser using available gestures. In this case, the instruction area 520 explains that the user can use their finger to move the cursor or tap it to select a link. Instructions also let the user know that they may use two fingers to scroll the page displayed by the game console's browser.

The control interface 500 includes a address bar 430 as described previously. The control interface 500 also includes a back button 534 that navigates the browser to the previously displayed web page. The refresh button 532 refreshes the current web page. The refresh button may be contextually updated based on the browser's current activity. For example, the refresh button 532 may be deactivated when the web browser is in the process of downloading a new webpage or refreshing an existing webpage. In both of these situations, the refresh button 532 is unnecessary. In one embodiment, the refresh button 532 is replaced with a stop button (not shown). The web browser may send a message to the companion device communicating that a new webpage is it being downloaded. The control application may update the refresh button 532 upon receiving the message. The web browser may also send a message acknowledging the completion of the download, at which time the refresh button 532 may be reactivated and a stop button removed.

The control icon 530 navigates the user back to the initial control interface 500 screen. The control tab 540 may also be used to navigate the user back to the control interface 500 from, for example, the text interface, which may be activated by selecting tab 550. The web hub 400 may be activated by selecting tab 560. The web hub has been described previously with reference to FIG. 4.

In one embodiment, the intended gesture is specifically selected through the control interface. For example, the control interface may depict various icons associated with the gestures that are available to control the browser. The user may then place their finger on the selected icon and simultaneously perform the gesture. In another example, the user selects the icon and then subsequently perform the related gesture, which is communicated as an instruction to the browser.

Cursor Movement and Object Selection

Turning now to FIG. 6, control of a cursor 620 associated with a game console's browser 615 using a companion device 630 is shown, in accordance with embodiment of the present invention. A display device 610 that is communicatively coupled with the game console displays the browser window 615. In the free-cursor-movement control mode, the user may move a cursor 620 associated with the browser window 560 615 by moving their finger 635 across the touch screen 633 on the companion device 630. The user may then tap their finger 635 on the touch screen 633 to select a link or other selectable feature displayed in the browser window 615. The cursor may take the form of a line, an arrow, a circle, or other shape.

Initially, touch input is received by the companion device. The touch points associated with the touch input are communicated to the game console. The control application on the companion device may normalize the touch points, forming normalized touch input. This means the actual pixel location (x, y) of the touch data are divided by the size of the touch area in pixels to yield a float between 0 and 1. For example, on a 480×800 screen, the touch point at (100,200) is sent as (0.2083333333333333, 0.25). These numbers are calculated by dividing 100 by 480 and 200 by 800.

Touch points are sent with a timestamp in milliseconds, so that the game console can incorporate timing based analysis as appropriate (e.g. for tap and drag detection). In one embodiment, the game console does not care what the base of the timestamp is; it only calculates deltas between timestamps. The console may assume the timestamp is the timestamp of the actual touch event, not the timestamp for when the message was created or sent. This allows the console to accurately detect tap events even when network stack delays and latency issues are involved.

In some embodiments, the companion device implements a throttling algorithm, which is designed to reduce the frequency that touch data is sent across the network, in order to better match the network characteristics. A companion device may send a ping to the game console, calculate the trip time, divide by two, and use the result to calculate transport time. For low latency connections, companion devices may attempt to send touch data at a frame rate that matches the browser frame rate (e.g. to achieve 60 frames per second (FPS) touch points are sent no more frequently than every ~16 ms). For higher latency connections, companion devices may send data at a lower frequency (e.g. 30 FPS or 20 FPS).

Below 20 FPS, movement feels choppy and devices may avoid using touch as an input mechanism. When this degree of latency is detected, the touch control may be deactivated and an explanation message provided to the user. As an alternative, gesture interpretation native to the companion device may be used and only the interpretation communicated to the game console.

Various throttling algorithms may be used to avoid spamming the network. In one example, if no touch points are active, then when the first touch point arrives, the companion device sets a timer to fire at desired frame rate (e.g. 60 FPS). The companion device may store current touch ID, coordinates, and timestamp in an array of touch points (e.g. 5), and sets a flag to indicate whether the data has been sent to the game console yet. If new touch point move data arrives, then locations are updated. When the timer fires, if the flag is not set, the device does nothing, otherwise the device sends all active touch points and clears the flag. If an up event arrives, the message is sent immediately, without waiting for the timer. This allows the device to collapse frequent move points to a single update. In one embodiment, the companion device sends all active touch points.

The game console interprets the touch data to determine how far to move the cursor. When the game console receives a touch point, the coordinates are scaled from the normalized touch data to game console screen coordinates by multiplying the normalized points by game console's screen dimensions. This allows the game console to effectively do direct mapping of device coordinates to the game console's screen. For example, on a 480×800 screen, the touch point at (100,200) is sent as (0.208,0.25). On game console this is scaled according to current screen size (1920,1080) to produce a scaled touch coordinate of (400, 270). Cursor movement be may calculated per frame using incoming touch data. Touch data generated by scaling the normalized touch data according to the primary device's screen size may be described a scaled touch data.

In one embodiment, the game console uses the scaled touch data without additional scaling or adjustment to interpret cursor movement. Without additional adjustment, the percentage of companion device screen traversed may be directly correlated to the cursor movement on the game console's screen. For example, if touch input traverses 50% of the companion screen's width than the cursor may be moved 50% of screens width on the game console. The scaled touch data may be used when the companion device has a screen falling into a designated range. Upon determining the screen on the companion device is in the designated range the scaled touch data may be interpreted. When outside the range, additional adjustments may be made to the scaled touch data before using it to generate a control input. In one embodiment, displays with a width less than three inches fall into the designated range. As orientation changes from portrait to landscape, some devices may transition out of the designated range.

In an embodiment, the scaled touch data is further modified before interpretation. Additional adjustments could be made in all cases or, as mentioned above, a screen size could used to determine whether additional adjustments are made. The additional adjustments attempt to normalize the input across various screen sizes to match optimized movements.

Taking the previously generated scaled touch data as input, next, device size optimization is applied. The game console's screen coordinates are scaled by multiplying by the ratio of the actual companion device to template screen size. For example, the points above (400, 270) are multiplied by (1.13, 1.13) to generate (454.152, 306). The 1.13 number is the ratio of the actual companion device's screen area to the template screen size area. This process generates optimized touch data.

When interpreting the touch data, the game console remembers the previous location and calculates a delta between points. The delta may be calculated for each frame of touch data received. In an embodiment, the delta is further adjusted to generate dampening and acceleration. The formula nx^p could be used, where n is a dampening coefficient (0.35), p is an acceleration component (1.25), and x is the delta. The effect is that for small deltas, the cursor moves small amounts and for large deltas the cursor moves even farther. The net effect for the user is that moving quickly over an inch on the companion device moves the cursor farther than moving slowly over the same physical distance.

In one embodiment, a cursor movement is derived from each frame of touch input. The cursor movement may be expressed as a new destination coordinate or in terms of movement length and direction. Once calculated, the cursor is moved from its existing location the derived distance. When a new touch event occurs, and is interpreted as a movement command, the cursor movement begins at the cursor's present location. Thus, for the first frame delta in a movement touch event, the new location is calculated by adding the derived movement to the cursor's present location.

In one embodiment, all single finger gestures on the screen are interpreted as cursor movement. Cursor movement may also include selecting an object and dragging an object. A tap is derived from the data when the following pattern is observed within a threshold time: a touch is detected, less than a threshold of movement occurs, followed by an up detection that describes a user removing their finger from the touch screen. Different movement thresholds may be used, but in one embodiment the movement threshold is less than 30 pixels and threshold time between the user touching the screen and removing their finger is 250 ms.

A single tap may select an object adjacent to the cursor. The user may then drag the object by moving the cursor. The object may be released by tapping the screen again. An object may be selected by double tapping the object. Other selection methods are possible.

In one embodiment, audio input captured by the companion device and communicated to the primary device for interpretation is used to control the cursor. For example, a user may speak, "select," "drag," "drop," "delete," or other similar command. The command is interpreted in view of the current cursor location within the application running on the primary application. Thus, a nearby object may be selected. In one embodiment, the microphone on the companion devices captures the audio data and communicates the audio data to the primary device, which interprets the audio data.

Two Finger Pan/Scroll Gesture

Turning now to FIG. 7, a pan gesture is illustrated, in accordance with an embodiment of the present invention. Shown in FIG. 7 are a display device 710, a browser 715 730 window in the display device, a user's fingers 735 and a companion device 730 having a touch screen 733. To implement the scroll or pan gesture, the user drags two fingers 735 across the touch screen on the companion device. The fingers 735 may be spaced apart from each other greater than a threshold distance for the gesture to be recognized. In response, the content in the browser 715 scrolls up or down accordingly. In one embodiment, the speed of the scrolling correlates with the speed of the pan gesture on the touch screen 733.

As described above with reference to cursor movement, the touch points received by the game console are used to recognize the touch/pan gesture. As with the cursor control, the companion device may normalize the touch data. The game console, then may generate scaled touch data by multiplying the normalize data by the game console's screen size. The scaled touch data may be optimized to a template screen size. In one embodiment, the scrolling or panning are accelerated or depressed based on the speed of the gesture using the acceleration/dampening algorithm described previously.

In one embodiment, audio input captured by the companion device and communicated to the primary device for interpretation is used to control scrolling. For example, a user may speak, "scroll up," "scroll down," "scroll right," "fast scroll," "slow scroll," "medium scroll," "stop scroll," or other similar command. The command is interpreted in view of the current cursor location within the application running on the primary application. Thus, an interface adjacent to the cursor may be scrolled if multiple interfaces are scrollable. If only a single interface is scrollable, then the single interface is scrolled. In one embodiment, the microphone on the companion devices captures the audio data and communicates the audio data to the primary device, which interprets the audio data.

Pinch Zoom

Turning now to FIG. 8, a zoom gesture is illustrated, in accordance with an embodiment of the present invention. FIG. 8 depicts a display device 810 displaying a browser 815 generated by a game console (not shown). FIG. 8 also depicts a companion device 830 having a touch screen 833 and a user's hand 835. To perform the zoom gesture, the user pinches their fingers 835 together while in contact with the touch screen 833. In response, the browser window 815 zooms in on its present center point. The degree of zoom may be derived from the distance of the pinch movement and speed of the pinch movement.

Pinch/Zoom is activated when the console detects that a second touch is part of the touch event. The second touch occurs when a second finger touches the screen. The pinch origin is centered on the present cursor location. Future zoom gestures calculate a new origin and magnitude as the cursor is moved. The previously mentioned acceleration logic may be used, where actual values passed to the touch subsystem use modified vector nx^p, where n is a dampening coefficient (0.35), p is an acceleration component (1.25), and x is the delta. The acceleration logic may be applied to the movement of both fingers. The origin point of the touch is centered at the current cursor position, and the vector and magnitude of pinch moves is relative to that point.

The pinch/zoom is differentiated from the two finger scroll by the movement of the fingers. When the fingers move towards each other, the pinch zoom is executed. If the fingers move the same direction while maintaining approximately the same distance, then pan/scroll is executed.

In one embodiment, audio input captured by the companion device and communicated to the primary device for interpretation is used to control zooming. For example, a user may speak, "zoom 200%," "zoom 400%," "zoom in," "zoom out," "slow zoom," "zoom 50%," "stop zoom," or other similar command. The command is interpreted in view of the current cursor location within the application running on the primary application. Thus, zoom may center on the current cursor location. In one embodiment, the microphone on the companion devices captures the audio data and communicates the audio data to the primary device, which interprets the audio data.

Tilt Gesture

Turning now to FIG. 9, a tilt gesture performed on a companion device is shown, in accordance with an embodiment of the present invention. The tilt gesture utilizes a companion device 930 having accelerometers and a touch screen 933. The tilt gesture is performed by moving the cursor 920 to a scrollable portion of a web site, such as friend's list 922 depicted in browser 915. Upon placing the cursor 920 in the scrollable section 922, the user may touch the touch screen 933 with one finger 935 and tilt the companion device 930 upwards or downwards to control the vertical scroll. The user may then select a different portion of the web site and repeat the process by tilting the companion device 930 up or down.

Turning now to FIG. 10, a twist gesture for horizontally scrolling, and for media control is shown, in accordance with an embodiment of the present invention. The twist gesture is performed by touching and holding a finger 1035 to the touch screen 1033 while simultaneously twisting the companion device 1030 left or right to scroll a horizontally scrollable list left or right. In another embodiment, a media may be fast forwarded or rewound using the same gesture. For example, the media may be rewound by touching and holding the touch screen 1033 on the companion device 1030 and twisting the device in the direction of the rewind button displayed on a browser.

Though described above as controlling vertical and horizontal scrolling, the tilt and twist gestures described in FIGS. 9 and 10, may also control panning the application interface up, down, left, or right. For example, a map application or document may be panned as needed. This application uses panning and scrolling interchangeably. Generally, scrolling may be used when the interface has a scroll bar and panning when it does not. Either way, the focus of the interface moves up, down, left, or right.

The tilt and twist gestures consume companion movement data in addition to the touch data. The touch data may be communicated to the game console as a normalized touch input, as described previously. Additionally, movement data, such as accelerometer or gyroscopic data may be provided to the game console. Both the tilt and twist gestures is initiated by detecting a touch and hold, without above a threshold amount of movement, on the touch screen. Once the touch and hold is detected, the cursor's present location within a user interface may be determined. If the portion of the interface or the entire interface may be scrolled or panned, then the tilt gesture's activation may continue.

Once activated, the present location or orientation of the companion device is determined. This location is used as the home location for the tilt gesture. Tilting the device up from the home location will cause an upward scrolling, while tilting the device downward will cause a downward scrolling. For example, if the initial position was detected to be 30 degrees above horizontal, then moving the device to 40 degrees above horizontal would cause an upward scrolling. Moving the device to 25 degrees above horizontal would cause a downward scrolling. The degree of movement away from home, either up or down, will cause the interface to scroll faster or slower. Thus, 15 degrees away from home would cause faster scrolling than 5 degrees away from home. The scrolling rate may be increases using a linear or exponential function. When the user removes their finger from the screen, the scrolling stops.

Twisting works in an identical fashion and the two gestures at the initial stage may be identical. In other words, the determination of vertical or horizontal scrolling, also known as panning, is determined based on the subsequent movement. With either gesture the home position may be the same. The home position records both the horizontal and vertical orientations. In this way, the horizontal and vertical scrolling may be combined by moving the device up and down and then twisting side to side, if allowed by the interface. If only one type of scrolling is enabled by the interface, then two of the companion device movements may correspond to the same type of scrolling. For example, when only vertical scrolling is allowed by the interface, then tilting the device up or twisting it to the right may both result in upward scrolling. Similarly, tilting the device down or to the left would result in downward scrolling. When only horizontal scrolling is allowed, tilting the device to the right or up would scroll to the right, while tilting the device down or to the left would scroll to the left.

In another scrolling embodiment, a portion of the screen is designated for various scrolling functions. For example, the side of the companion touch screen device may be used to scroll an interface by sliding the finger up and down along the side portion of the interface. This scrolling could be activated with one finger and differentiated from cursor movement because it is located along the side of the interface. Horizontal scrolling could be affected by sliding a finger along the bottom of the interface. Once scrolling is activated, various scrolling functions could be achieved by touching designated portions of the screen. For example, once scrolling along the side of the screen is initiated, touching the top right corner could cause the interface to leap directly to the top of the interface. Touching the bottom right corner could cause the interfacet to leap to the bottom. In one embodiment, the side interface scrolling moves faster as the person moves their finger away from the mid-point of the interface.

Keyboard

Turning now to FIG. 11, a soft keyboard 1133 on the companion device 1130 is used to enter text into a text box 1120 displayed in a game console's browser 1115. The game console's browser 1115 is displayed on display device 1110, which is communicatively connected to the game console.

The keyboard may be activated automatically by selecting a textbox within an interface displayed on the game console. The game console sends a message to the companion device indicating that a textbox has been selected. In response, the soft keyboard automatically opens. Text entered into the keyboard is then communicated to the game console and appears within the textbox as the user types.

Remote Media Control

In this embodiment, the user controls media (e.g., a movie or TV show) using a companion device. In FIG. 12, a playhead 1220 is provided on the companion device's touch screen 1210. The playhead 1220 is displayed near the bottom of the screen. The user may move their finger 1250 along the playhead 1220 to the exact point 1225 in the media they wish to experience. This may be done in a drag and drop operation and the media may advance in a one-to-one ratio with the movement of the finder. Media previews showing a thumbnail 1232 from before the current spot, at the current spot 1234, and after the current spot 1236 may be provided.

Turning now to FIG. 13, for finer, or slower, control, the user moves their finger 1250 above the playhead 1220 to find a specific point in the media. The further the finger 1250 is from the playhead 1220 the slower the media advances giving the user the precise control to find a desired part in the media content. Again, thumbnails 1342, 1344, and 1346 show clips of the content may be provided.

In one embodiment, that is not illustrated in the figures, a user may pause a media presentation by tapping on the companion device's touch screen. A particular area of the screen, such as the center, may be designated for this purpose. When the media is paused, taping the screen may play the media.

Methods Using Companion Device to Control Remote Interface

Figure 14:
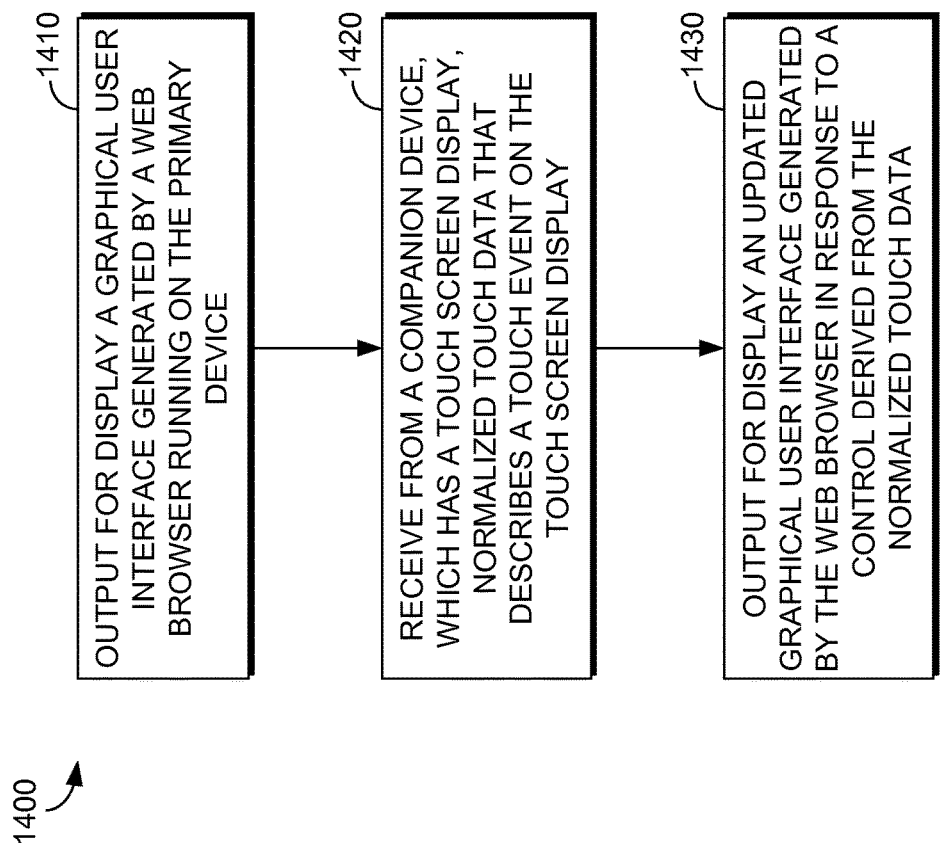
FIG. 14 is a flow chart a method of using a companion device to control an application running on a primary device, in accordance with an embodiment of the present invention.

Turning now to FIG. 14, a method 1400 of using a companion device to control an application running on a primary device is shown, in accordance with an embodiment of the present invention. As mentioned previously, a companion device may be a tablet, smart phone, personal computer, or other device that has a touch screen display and is capable of communicating with other devices. The primary device may be a game console, a television, DVR, cable box, or other device that is capable of running applications, such as a web browser, and generating a rendered display that is output to a display device.

At step 1410, a graphical user interface generated by a web browser running on the primary device is output for display. A web browser is an application capable of displaying web pages and other similar documents, including those written in HTML. In one embodiment, the graphical user interface displays a webpage that is retrieved by the primary device. The primary device is not mirroring content retrieved by the companion device.

At step 1420, normalized touch data is received from a companion device which has a touch screen display. The normalized touch data describes a touch event on the touch screen display. The normalized touch data describes each X coordinate as a percentage of the touch screen's width and each Y coordinate as a percentage of the touch screen display's height. For example, each coordinate could be a number between 0 and 1 that is calculated by dividing the coordinate, perhaps designated as a pixel, by the total number of pixels available within the display device's width. As mentioned previously, the normalized touch data may be communicated in multiple frames. The frame rates at which the touch data is communicated may vary, depending on the context.

At step 1430, an updated graphical user interface generated by the web browser in response to a control derived from the normalized touch data is output for display. In one embodiment, the control is derived after further processing of the normalized touch data. For example, scaled or optimized touch data, as described previously, may be generated before the control is derived. In one embodiment, the control indicates that a cursor should be moved in a direction and distance indicated by the control. In one embodiment, the control is derived by taking a delta between different frames to indicate how far and in what direction the cursor should be moved.

In another embodiment, movement data for the companion device is received with the touch data. The movement device may indicate orientation of the device. When the user interface is determined to be capable of scrolling up or down or right or left, referred to as scrolling or panning, then a scrolling function may be activated. The orientation of the device in the first frame received in conjunction with the scrolling command may form the home position. Twisting the device right or left can cause the screen to scroll right or left and tilting the device up or down from the home position may cause scrolling up or down. In another embodiment, the home base is artificially set to level and the scrolling commands are derived by determining the device's present orientation relative to level.

Figure 15:
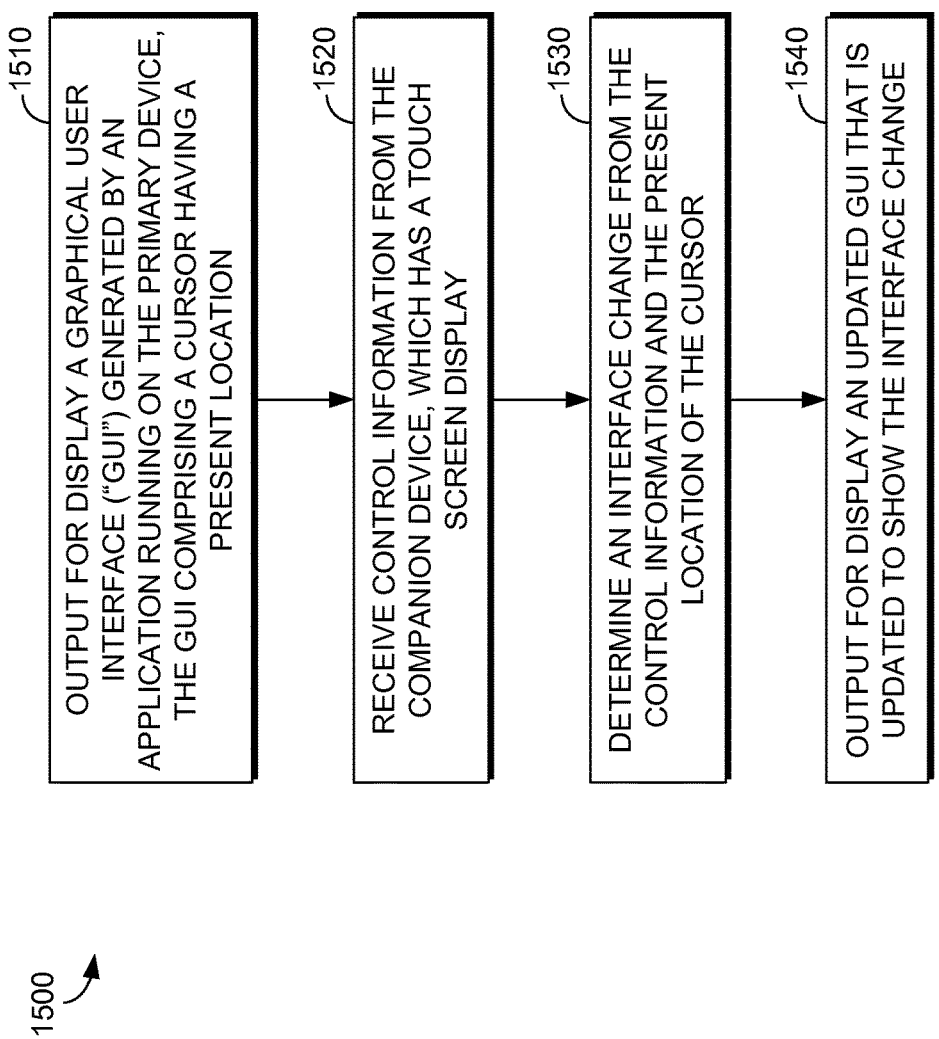
FIG. 15 is a flow chart a method of using a companion device to control an application running on a primary device, in accordance with an embodiment of the present invention.

Turning now to FIG. 15, a method 1500 for using a companion device to manipulate a graphical user interface generated by an application operating on a primary device is shown, in accordance with an embodiment of the present invention. At step 1510, a graphical user interface generated by an application running on the primary device is output for display. The graphical user interface comprises a cursor having a present location. The application may be a web browser, a video game, a media selection or control interface, or other application. The display may be output on a TV or other display device communicatively coupled to the primary device. In one embodiment, a graphical user interface is not output for display on the companion device.

At step 1520, control information is received from the companion device, which has a touch screen display. In one embodiment, the control information originates from input on the touch screen display. The control information could be movement information describing an orientation and movement of the companion device. Movement data may be gathered through an analysis provided by a gyroscope or accelerometers.

At step 1530, an interface change is determined from the control information and the present location of the cursor. The present location of the cursor can be used in a variety of different ways to generate or determine the interface change. For example, when a cursor movement is detected, the present location of the cursor is the starting point for the movement. When a scroll command is derived from the control data, then an interface adjacent to the present location of the cursor is used to determine which interface to scroll. If the interface adjacent to the cursor is not scrollable, then an error message may be returned in response to the control to scroll.

At step 1540, an updated graphical user interface is updated to show the interface change is output for display. Cursor movement and scrolling are two examples of interface changes. Zooming would be another example of interface changes that may utilize the cursor's present location. For example, the cursor's present location may be the center of the adjusted interface. In other words, the interface may be changed to zoom in or out on the cursor location.

Figure 16:
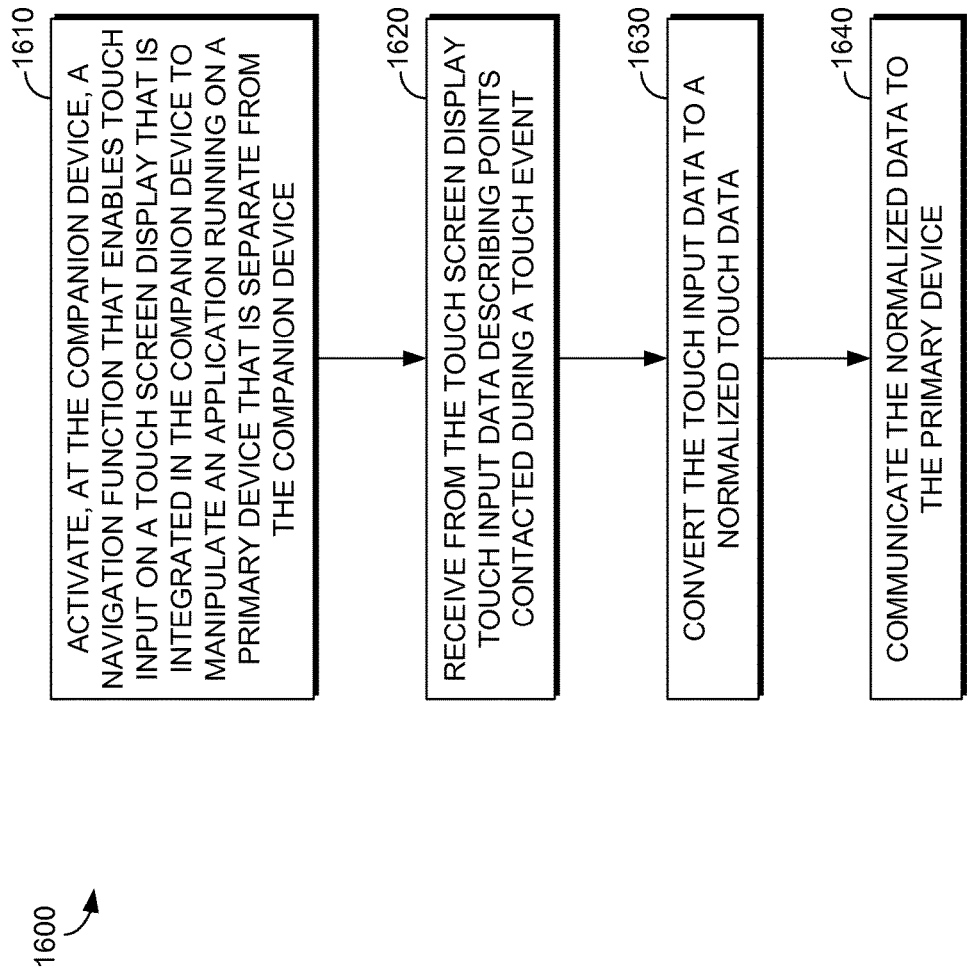
FIG. 16 is a flow chart a method of using a companion device to control an application running on a primary device, in accordance with an embodiment of the present invention.

Turning now to FIG. 16, a method 1600 for using a companion device to manipulate a graphical user interface generated by an application operating on a primary device is shown, according to an embodiment of the present invention. Method 1600 may be performed by a companion device, such as smart phone or a slate. The primary device may be a game console, television, media center, or other device capable of running applications and presenting media.

At step 1610, a navigation function that enables touch input on a touch screen display that is integrated in the companion device is activated. The navigation function allows the companion device to manipulate an application running on a primary device that is separate from the companion device. For example, the navigation function may allow the companion device to manipulate a web browser running on the primary device.

At step 1620, touch input data is received from the touch screen display. The touch input data describes points contacted during a touch event.

At step 1630, the touch input data is converted into a normalized touch data that describes the point's X coordinates as a percentage of the touch screen display's width and the Y coordinates as a percentage of the touch screen display's height.

At step 1640, the normalized data is communicated to the primary device. In addition, characteristics of the companion device may be communicated from time to time to the primary device. For example, the screen area or resolution may be communicated to the primary device upon making an initial connection or upon opening the navigation function. In one embodiment, upon detecting an orientation change to the companion device, a new screen size is communicated to the primary device. While the screen size does not change upon changing the device's orientation, the width and the height are flip-flopped which may be important when scaling the touch input on the primary device. In one embodiment, the companion device does not communicate a derived control to the primary device. In other words, the companion device does not interpret the touch data independently and communicate a resulting control instruction; instead, the touch data is communicated to the primary device for the primary device to interpret.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of using a companion device to control an application running on a primary device, the method comprising:
    outputting for display to a screen on a display device a graphical user interface generated by an application running on the primary device;
    receiving from the companion device, which has a touch screen display, a normalized touch data that describes a touch event comprising an object contacting the touch screen at a plurality of touch points on the touch screen display, the normalized touch data comprising a normalized x coordinate and a normalized y coordinate for each of the touch points, wherein the normalized x coordinate is calculated using the formula $x_n=x/w$ where $x_n$ is the normalized x coordinate, x is an x coordinate for a touch point, and w is the width of the touch screen display in pixels; wherein the normalized y coordinate is calculated using the formula $y_n=y/h$ where $y_n$ is the normalized y coordinate, y is an y coordinate for the touch point, and h is the height of the touch screen display in pixels, wherein the touch event is movement across the touch screen;
    calculating a distance an object on the graphical user interface is to be moved using the normalized touch data as input and applying a dampening logic that adjusts a delta calculated between touch points using both a dampening coefficient and an acceleration component; and
    outputting for display to the display device an updated graphical user interface generated by the application showing the object moved the distance.

2. The method of claim 1, wherein the method further comprises:
    rescaling the normalized touch data by multiplying the normalized x coordinate by a width of the updated graphical user interface and the normalized y coordinate by the height of the updated graphical user interface to generate scaled touch data; and
    interpreting the scaled touch data to determine the distance derived from the normalized touch data.

3. The method of claim 1, wherein the method further comprises:
    rescaling the normalized touch data by multiplying the normalized x coordinate by a width of the updated graphical user interface and the normalized y coordinate by the height of the updated graphical user interface to generate scaled touch data;
    generating an optimized touch data by multiplying the scaled touch data by a factor that is a ratio of the companion device's screen size to a template screen size, and
    interpreting the optimized touch data to determine the distance derived from the normalized touch data.

4. The method of claim 1, wherein the object is a cursor.

5. The method of claim 1, wherein a scroll function is activated when the touch event indicates that two fingers are contacting the touch screen display and remain a threshold distance apart as they move.

6. The method of claim 1, wherein the method further comprises receiving movement data from the companion device.

7. One or more computer-storage media comprising computer-executable instructions embodied thereon that when executed by a computing device performs a method for using a companion device to manipulate a graphical user interface generated by an application operating on a primary device, the method comprising:
outputting for display on a screen of a display device a graphical user interface ("GUI") generated by the application running on the primary device, the GUI comprising a cursor having a present location;
receiving control information from the companion device, which has a touch screen display, the control information comprising a normalized touch data that describes a touch event comprising an object contacting the touch screen at a plurality of touch points on the touch screen display, the normalized touch data comprising a normalized x coordinate and a normalized y coordinate for each of the touch points, wherein the normalized x coordinate is calculated using the formula $x_n = x/w$ where $x_n$ is the normalized x coordinate, x is an x coordinate for a touch point, and w is the width of the touch screen display in pixels; wherein the normalized y coordinate is calculated using the formula $y_n = y/h$ where $y_n$ is the normalized y coordinate, y is an y coordinate for the touch point, and h is the height of the touch screen display in pixels, wherein the touch event is movement across the touch screen;
calculating a distance an object on the graphical user interface is to be moved using the normalized touch data as input and applying a dampening logic that adjusts a delta calculated between touch points using both a dampening coefficient and an acceleration component;
and
outputting for display an updated GUI showing the object moved the distance.

8. The media of claim 7, wherein the GUI height is less than a height of the display device.

9. The media of claim 7, wherein the movement data indicates the companion device is tilted up from the home position and the direction of scrolling is up.

10. The media of claim 7, wherein the movement data indicates the companion device is twisted rightward from the home position and the direction of scrolling is to the right.

11. The media of claim 7, wherein the home position is a position of the companion device when a scroll function is activated in response to the movement data.

12. The media of claim 7, wherein the normalized touch data describes a finger moving down a side of the touch screen display.

13. A computing system to implement a method for using a companion device to manipulate a graphical user interface generated by an application operating on a primary device, the computing system comprising:
a processor; and
computer storage media having computer-executable instructions stored thereon which, when executed by the processor, configure the computing system to:
activate, at the companion device, a navigation function that enables touch input on a touch screen display that is integrated in the companion device to manipulate the application running on the primary device that is separate from the companion device and has a separate;
receive, from the touch screen display, touch data describing points contacted during a touch event comprising an object contacting the touch screen at a plurality of touch points;
convert the touch data to a normalized touch data; the normalized touch data comprising a normalized x coordinate and a normalized y coordinate for each of the touch points, wherein the normalized x coordinate is calculated using the formula $x_n = x/w$ where $x_n$ is the normalized x coordinate, x is an x coordinate for a touch point, and w is the width of the touch screen display in pixels; wherein the normalized y coordinate is calculated using the formula $y_n = y/h$ where $y_n$ is the normalized y coordinate, y is an y coordinate for the touch point, and h is the height of the touch screen display in pixels;
dynamically adjust a frame rate at which the normalized touch data is communicated to the primary device to match a frame rate of the primary device based on network latency characteristics; and
communicate the normalized touch data to the primary device that is associated with a display device having a primary screen.

14. The computing system of claim 13, wherein the computing system is further configured to, subsequent to the touch event, detect an orientation change of the companion device and communicating, prior to a subsequent touch event, an updated screen area for the touch screen display to the primary device.

15. The computing system of claim 13, wherein the computing system is further configured to receive a message from the application running on the primary device that a web page is loading and, in response, enable a stop button displayed on the touch screen display, the stop button associated with a function that instructs the application to stop loading the web page.

16. The computing system of claim 13, wherein the computing system is further configured to:
receive a message from the application running on the primary device that the web page has just finished loading and, in response, enable a refresh button displayed on the touch screen display, the refresh button associated with a function that instructs the application to reload the web page; and
disable the stop button.

* * * * *